US010733079B2

(12) United States Patent
Hui

(10) Patent No.: US 10,733,079 B2
(45) Date of Patent: Aug. 4, 2020

(54) SYSTEMS AND METHODS FOR END-TO-END TESTING OF APPLICATIONS USING DYNAMICALLY SIMULATED DATA

(71) Applicant: Oracle International Corporation, Redwood Shores, CA (US)

(72) Inventor: Vernon W. Hui, Bellevue, WA (US)

(73) Assignee: Oracle International Corporation, Redwood Shores, CA (US)

(*) Notice: Subject to any disclaimer, the term of this patent is extended or adjusted under 35 U.S.C. 154(b) by 208 days.

(21) Appl. No.: 15/972,899

(22) Filed: May 7, 2018

(65) Prior Publication Data

US 2018/0349254 A1    Dec. 6, 2018

Related U.S. Application Data

(60) Provisional application No. 62/513,355, filed on May 31, 2017.

(51) Int. Cl.
*G06F 11/36*    (2006.01)

(52) U.S. Cl.
CPC ...... *G06F 11/3664* (2013.01); *G06F 11/3688* (2013.01); *G06F 11/3692* (2013.01)

(58) Field of Classification Search
CPC .............................. G06F 11/36; G06F 11/3664
USPC ........................................................ 714/38.1
See application file for complete search history.

(56) References Cited

U.S. PATENT DOCUMENTS

| | | | | |
|---|---|---|---|---|
| 10,002,216 B2* | 6/2018 | Ikram | ...................... | G06F 30/33 |
| 2002/0157035 A1* | 10/2002 | Wong | .................. | G06F 11/0709 |
| | | | | 714/4.11 |
| 2002/0178396 A1* | 11/2002 | Wong | .................. | G06F 11/0709 |
| | | | | 714/4.11 |
| 2005/0120273 A1* | 6/2005 | Hudson | ............... | G06F 11/0748 |
| | | | | 714/38.11 |
| 2008/0208369 A1* | 8/2008 | Grgic | ........................ | G06F 8/60 |
| | | | | 700/20 |
| 2012/0017121 A1* | 1/2012 | Carlson | ............... | H04L 41/0654 |
| | | | | 714/43 |
| 2013/0151906 A1* | 6/2013 | D'Alterio | ........... | G06F 11/3692 |
| | | | | 714/38.1 |
| 2014/0289569 A1* | 9/2014 | Tachikawa | ........... | G11C 29/848 |
| | | | | 714/42 |
| 2015/0227406 A1* | 8/2015 | Jan | ........................ | G06F 11/079 |
| | | | | 714/37 |
| 2015/0355957 A1* | 12/2015 | Steiner | ................ | G06F 11/0787 |
| | | | | 714/37 |
| 2016/0154688 A1* | 6/2016 | Barajas | ............... | G06F 11/0727 |
| | | | | 714/37 |
| 2018/0013657 A1* | 1/2018 | Cantwell | ................. | H04L 43/08 |
| 2019/0199772 A1* | 6/2019 | Pennarun | ................ | H04L 65/80 |

* cited by examiner

*Primary Examiner* — Kamini B Patel

(74) *Attorney, Agent, or Firm* — Kilpatrick Townsend & Stockton, LLP

(57) ABSTRACT

The present disclosure generally relates to end-to-end testing of applications using simulated data. More particularly, the present disclosure relates to systems and methods that test applications in a production environment by dynamically generating and tracking the simulated data in real time. In some implementations, an expected number of simulated user profiles (e.g., based on a protocol for generating simulated user profiles) can be compared against an actual number of simulated user profiles stored in a state machine to identify issues within the end-to-end environment of the application being tested.

20 Claims, 13 Drawing Sheets

SYSTEMS AND METHODS FOR END-TO-END TESTING OF APPLICATIONS USING DYNAMICALLY SIMULATED DATA

CROSS REFERENCE TO RELATED APPLICATIONS

This application claims the priority benefit of U.S. Provisional Application No. 62/513,355, filed on May 31, 2017, the disclosure of which is incorporated by reference herein in its entirety for all purposes.

TECHNICAL FIELD

The present disclosure generally relates to end-to-end testing of applications using simulated data. More particularly, the present disclosure relates to systems and methods that provide a platform for testing applications and/or application features in a production environment. The platform can dynamically generate simulated data over time, and track the simulated data using a state machine.

BACKGROUND

In a typical software application, testing is generally performed by quality assurance teams. A quality assurance team may create a functional equivalent system that represents a copy of the software application. The quality assurance team may then test the functional equivalent system by executing a suit of test cases on the functional equivalent system in a testing environment. For example, the suit of test cases may include black box or white box testing methodologies. Further, the testing environment is designed to mimic a real-world production environment in which the software application runs on a day-to-day basis. However, functional equivalent systems are generally not scalable for today's real-world big-data environments. Traditional testing environments and test cases do not accurately replicate the large scale and highly variable characteristics of today's Internet traffic. For instance, a software-as-a-service (SaaS) application processes massive amounts of dynamically-changing data that flows in and out of the environment at a very fast rate. The typical suit of test cases executing on functional equivalent systems does not realistically simulate this uncertain nature of the massive amounts of data. Thus, testing functional equivalent systems in big-data environments does not accurately provide insight on the health of the application or potential issues that may arise in the production environment.

SUMMARY

Applications operating today may stream or manipulate massive amounts of data for a large number of users. For example, a video streaming application or a video gaming platform may be configured to transfer big data to potentially millions of user devices at any given time. As another example, applications may analyze behavior data of users navigating the Internet at a big-data scale. These applications may be configured to integrate with various external systems (e.g., an external system may be an application partner that provides content data to be integrated into a video streaming application). For example, integrating an external system into an application may include defining a data pipeline that receives a data stream from the external system and ingests the data stream into the application's environment for processing. Additionally, these applications may be configured to process large amounts of real-world user profiles. For example, a real-world user profile can include metadata that represents the behavior of a user device based on data collected from interactions between the user device and various servers. Further, tracking data running on a browser may detect one or more events in association with a user profile (e.g., submitting a query using a search engine, tapping a link in a mobile application, entering data into an input element in a mobile application, and so on). The one or more events may be translated into attributes (or metadata) or mapped onto attributes that are stored in the profile. The data stored in the real-world user profiles may characterize the behavior of the user operating the user device (e.g., attributes representing interests of the user). The data contained in the real-world user profiles and/or the number of real-world user profiles processed by an application may change frequently. For instance, as a user device interacts with new web servers, the data contained in the corresponding real-world user profile is continuously updated based on the user device activity. Further, at any given time, a subset of the total number of real-world user profiles may expire (e.g., after 30 days or due to relevancy). Accordingly, the high volume and complexity of real-world user profiles makes mimicking a production environment very difficult. As a result, testing an application at a big-data level to identify issues that may potentially arise in the production environment may solve one or more of the technical challenges described above.

Certain aspects and features of the present disclosure relate to systems and methods for end-to-end testing of applications in real-time production environments. Certain implementations of the present disclosure provide a testing platform that enables big-data-level testing of application environments. In some implementations, the testing platform may be configured to test an application's ability to accurately process big data. As only non-limiting examples, the testing platform may evaluate an application's integration with external systems, the health of servers in the production environment associated with the application, data pipelines into and out of the production environment, classification rules, delivery systems, and so on.

In some implementations, the testing platform may test applications by generating simulated data, such as user profiles that have similar complexity to real-world user profiles (e.g., profiles that automatically change or expire over time), tracking the generation, changes, and/or expiration of the simulated user profiles in various states of a state machine, and comparing actual results against expected results to determine issues with the application. In some implementations, comparing actual results against expected results may include comparing a number of expected simulated user profiles (that correspond to an attribute) against a statistical counting of the actual number of simulated profiles (that correspond to that attribute) and that are stored in the state machine.

To illustrate and only as a non-limiting example, the testing platform may generate one hundred thousand simulated profiles on a daily basis for 30 days to generate a total of three million simulated user profiles. The three million simulated user profiles may be ingested into an end-to-end system in which an application is deployed. Ingesting the simulated profiles may include tracking the generation of the simulated user profiles in a state machine over time. In some implementations, each simulated user profile may include one or more attributes that are user defined. For example, an attribute may characterize the simulated user profile (e.g., the user profile corresponds to a user interested in specific content data). In some implementations, each simulated profile may include one or more attributes that are randomly or pseudo-randomly assigned to the simulated user profile. If all three million simulated user profiles are user defined to correspond to male users, then the expected result of simulated user profiles (extracted from the application) that correspond to male users would be three million simulated user profiles. To determine the actual number of simulated user profiles that correspond to male users, the testing platform can perform a statistical counting of the simulated user profiles that are stored in the state machine after 30 days (or after a simulation of 30 days). If, for example, the actual number of simulated user profiles stored in the state machine that correspond to male users is 2.9 million, then the testing platform would determine an error between the expected number and the actual number amounting to 0.1 million user profiles. The error may represent an issue with one or more aspects of the end-to-end application environment, such as faulty load balancing between production servers.

Non-limiting examples of issues that may cause the error between the expected number of simulated user profiles and the actual number of simulated user profiles stored in the state machine may include external systems incorrectly integrating into the testing platform (e.g., an external system that transmits a data stream to the testing platform may have incorrectly called the URI or URL of the testing platform, which would cause some data not to be ingested into the testing platform), incorrectly coded rules that parse argument strings used to classify simulated user profiles, technical issues in the testing platform or the network environment as a whole (e.g., servers running the production environment may be overly burdened with processing loads, CPU usage of the servers running the production environment may be too high causing data to be lost, an incorrect load balancing between servers in the environment, and so on), and other suitable technical issues. Advantageously, because the testing platform ingests real-time data from external systems, simulated user profiles, and the like, the testing platform can identify technical issues that may arise while the application is running in the real-world production environment. Continuing with the example above, the three percent error between the expected number of simulated user profiles and the actual number simulated user profiles stored in the state machine may be caused by faulty load balancing between production servers, which may cause some data to be lost when servers are overloaded.

In some implementations, the testing platform may generate a plurality of simulated user profiles (e.g., one hundred thousand profiles, one million profiles, one billion profiles, etc.) at regular or irregular intervals to test features of an application (e.g., a native or web application). The generated simulated user profiles may be stored in a state machine at each regular or irregular interval to represent a snapshot of the number of simulated user profiles (and the corresponding attributes stored in the simulated user profiles) at that particular time. In some implementations, a simulated user profile can be a simulated cookie or other data tracking attributes or events associated with a simulated browser. Each simulated user profile can include one or more metadata attributes from a set of available metadata attributes. For example, the number and/or type of metadata attributes included in a first simulated user profile can be different than the number and/or type of metadata attributes included in a second simulated user profile. In some implementations, a metadata attribute represents a characteristic of a user profile (e.g., logged into to a system, recency, frequency, permissions, and so on). The values for the metadata attributes can be generated using real-world digital and/or offline data sources, described later herein. In contrast to simulated user profiles, real-world user profiles are generated by applying rules to URL parameters captured by tracking data that monitors the behavior of a real user's browser. Attributes or events associated with a real user's browser may be captured from one of a plurality of end-user devices as a browser running on the end-user device, typically through end-user direction, interacts with a web site. Further, a cookie may represent an implementation type of a profile. Examples of implementations types of a profile may include a hashed email address, a mobile device identifier (ID), and other suitable implementation types. Different devices interact with the site, resulting in different cookies that feed into potentially the same or different real-world user profiles, depending on whether the devices are predicted to be associated with the same entity or not. A simulated user profile, on the other hand, is generated by defining a set of one or more metadata attributes from all available metadata attributes, and these metadata attributes can be gleaned from automatically-generated URL parameters that are defined to include any combination of arguments. An argument may correspond to a metadata attribute. For example, a URL parameter can be automatically generated by generating a call to an HTTP endpoint and applying one or more rules to the cite identifier and/or HTTP header information of the HTTP endpoint. The one or more rules may evaluate each argument to determine which metadata attribute corresponds to the argument.

The complex and frequently-changing nature of the simulated user profiles can be tracked over time using a state machine. For example, the simulated user profiles and their corresponding metadata attributes can be stored in the state machine. Each simulated user profile can potentially include attributes that are subject to change at predetermined or random times. The state machine can track the generation, changes, and/or expiration of the simulated user profiles as time progresses. For example, tracking can include continuously (at regular or irregular intervals) storing the current state of the simulated user profiles. Further, the current state of the simulated users profiles can be the total population of simulated user profiles (and the complex metadata attributes associated with each simulated user profile) that exist at a given time. Just as in the real world, the state of the simulated user profiles may be different from one minute to the next. The state of the simulated user profiles can be modified using weighted aggregate values without regenerating the entire state. Additionally, when a new simulated user profile is generated, the new simulated user profiles and its corresponding complex metadata attributes are stored in the state machine. Similarly, if a simulated user profile changes (e.g., a permission stored in the simulated user profile changes), that metadata change can be tracked and stored in the state machine. For example, the state machine can store the simulated user profile before the change in a state, and also, store the simulated user profile after the change in a different, later state. Lastly, if a simulated user profile expires, the simulated user profile can be removed from the state machine after the expiration, however, the state machine can still store the simulated user profile in states that existed before the expiration of the simulated user profile.

As a non-limiting example, on a particular day (herein referred to as "day one"), one million simulated user profiles can be generated by a data simulator. Each simulated user profile can randomly include any combination of metadata attribute A (e.g., interested in cars, or an indication that a user streamed particular video data using a video content application), attribute B (e.g., interested in electronics, or an indication that a user selected a particular application with in a video streaming environment with multiple applications from different content providers), and/or attribute C (e.g., interested in particular objects). In some implementations, one or more simulated user profiles of the one million simulated user profiles can include additional metadata attributes. For example, an additional metadata attribute can represent a frequency associated with the simulated user profile. Frequency can represent the number of times the simulated user profile was detected at a website within a defined time period (e.g., performing a query twice by the same cookie may represent a frequency of two). Thus, some simulated user profiles include metadata attributes A, B, or C singularly (e.g., in situations where frequency is one), while some simulated user profiles include various combinations of metadata attributes (e.g., AB, BC, AC, ABC, CABB, and so on, in situations where frequency is greater than one). Additionally, a metadata attribute can represent recency of the simulated user profile (e.g., how long ago the user profile was detected). For example, on day one, each of the simulated user profiles that were generated on day one have a recency metadata attribute of "zero" (e.g., created today).

Continuing with this non-limiting example, on day two, another one million new simulated user profiles can be generated by the data simulator. On day two, the data simulator modifies the metadata attributes relating to recency of all simulated user profiles generated on day one from "zero" to "one" (e.g., representing that the simulated user profiles from day one were generated one day ago). In some implementations, instead of modifying the metadata attributes relating to recency from day "zero" to day "one," another way to represent the change in recency is to subtract from the timestamp of the prior day to the current day. Further, the recency metadata attributes of all simulated user profiles generated on day two would have a recency metadata attribute of "zero" (e.g., created on day two). In some implementations, one or more metadata attributes are set to expire after a defined time period. As a non-limiting example, within a video game, a "power-up" or any other collectable item may be available for collection for a short period of time (e.g., 10 seconds) by a user operating an avatar. As another non-limiting example, if a metadata attribute represents that a simulated user profile is "interested in electronics," this metadata attribute may be set to expire when the recency metadata attribute equals 10 days (e.g., when the "time-to-live" equals 10 days). In some implementations, simulated user profiles may be queried based on the recency data (e.g., query for recency within the past 10 days, then simulated user profiles with recency of beyond 10 days would not be returned as a result of the query). Once expired, the metadata attribute is deleted from the one or more metadata attributes included in the simulated user profile. To illustrate, an example simulated user profile includes three metadata attributes: 1) interested in electronics, 2) interested in cars, and 3) a recency of 10 days (e.g., last detected 10 days ago). On the next day, the example simulated user profile is modified to include only two metadata attributes: 1) interested in cars, and 2) a recency of 11 days (e.g., the "interested in electronics" metadata attribute was automatically deleted due to expiration after 10 days). In some implementations, simulated user profiles are set to expire after a defined time period. For example, a simulated user profile associated with a desktop device can be set to expire after seven days, whereas, a simulated user profile associated with a mobile device can be set to expire after 14 days.

In some implementations, the simulated user profiles can be categorized (e.g., as they are generated) according to metadata attributes. The categorized metadata can be then be stored in a state machine in a continuous manner. In these implementations, the state machine would be continuously and dynamically changing as time progresses because metadata attributes and/or simulated user profiles would expire and/or new simulated user profiles would be generated at the regular or irregular intervals. The continuously-changing state machine accurately reflects the big data complexities of the Internet.

The total set (e.g., population) of simulated user profiles and their corresponding metadata attributes that exist at a particular time can be stored as a state of a state machine. Tracking the generating of simulated user profiles can include continuously storing the total set of simulated user profiles or profile attributes at various times as time progresses. For example, tracking can include continuously storing a state of the total set of simulated user profiles at a regular or irregular interval so as to track the changes to the total population over time.

In some implementations, features of an application (e.g., web or native application) can be continuously tested using a test platform that tests for errors or bugs that may arise when the application processes the large amount of dynamically-changing simulated data stored in the state machine. Further, in some implementations, the testing platform can also identify operating parameters of each component (e.g., internal subsystems of the production environment, including data pipelines, load management of servers, etc.) of the production environment while the application processes the simulated data. In some implementations, test cases (e.g., data campaigns) can be executed on the simulated data stored in the state machine and the result of the test cases can be delivered to end points. For example, on day 1, a test case is performed on a first set of simulated data (e.g., the simulated user profiles stored in the state machine at day 1), and on day 2, the same test case is performed on a different set of simulated data (e.g., the simulated user profiles stored in the state machine at day 2). Further, the data that flows into (e.g., simulated user profiles that are generated) and out of (e.g., simulated user profiles that expire) the state machine is tracked so that developers can identify simulated user profiles, simulated user events, activities or attributes that were generated one month ago, two months ago, and so on.

Advantageously, the simulated data stored in the state machine may be dynamic, random, and complex, which is more representative of real-world user interactions, as opposed to the existing solutions that generate functional equivalent systems and perform testing in an isolated testing environment. Further, the changes to the population of simulated user profiles are tracked over time so that the state of the population of simulated user profiles can be identified for any given time. Tracking the state of the population of simulated user profiles over time may allow for a comparison between expected results and actual results, and this comparison can expose issues that may arise when the application is live in the production environment. For example, an expected result may be a user-defined number of simulated user profiles generated over a period of time (e.g., 100 thousand simulated user profiles generated daily for 30 times yields an expected result of three million simulated user profiles), and an actual result may be determined from a statistical counting of the number of user profiles that are stored in the state machine (e.g., only 2.9 million simulated user profiles are stored in the state machine). A difference between the expected results and the actual results represents a technical issue that at least some of the data that is being generated is not being properly ingested into the testing platform. As another advantage, testing is performed in the production environment, so the components of the production environment can be tested under conditions that mimic the complexity of today's real-world data flows. For instance, if a feature of an application is being tested using the testing platform according to certain embodiments, the feature can be tested within the production environment (as if the feature were live and accessible to users).

Certain embodiments may include a computer-implemented method. The computer-implemented method may include receiving, at a testing system, one or more data streams. Each data stream of the one or more data streams may be received from an external system. The testing system may be configured to test for issues or bugs in an application deployed in a production environment. Further, the production environment may enable end users to access the application. The computer-implemented method may also include generating a set of events using the one or more data streams. Each event of the set of events may correspond (e.g., be mapped onto) to a metadata attribute. Each metadata attribute may include a portion of data from a data stream of the one or more data streams. The computer-implemented method may also include generating a plurality of simulated user profiles according to a protocol. Each simulated user profile may simulate an end user of the application in the production environment. The protocol may include one or more rules for iteratively generating one or more simulated user profiles at an interval. The protocol may define a subset of the set of metadata attributes to associate with each simulated user profile, and each simulated user profile may be characterized by the associated subset of metadata attributes. The computer-implemented method may also include ingesting the plurality of simulated user profiles using the application deployed in the production environment. In some implementations, ingesting may include storing the one or more simulated user profiles in a state machine. The state machine may correspond to a plurality of states, such that each state corresponds to a particular time associated with the interval. For example, a first state may correspond to Day 1, and a second state may correspond to Day 2, and each state represents the total population of simulated user profiles that exist at the particular time associated with the interval. For example, the first state represents the total population of simulated user profiles that exist on Day 1, and the second state represents the total population of simulated user profiles that exist on Day 2. The computer-implemented method may also include executing a test code. In some implementations, the test code compares a number of simulated user profiles stored in the state machine with a number simulated user profiles expected to be generated. The number of simulated user profiles expected to be generated may be determined using the one or more rules included in the protocol. The computer-implemented method may also include determining whether an issue or bug exists in the application deployed in the production environment. The determination may be based on the comparison. Further, a difference between the number of simulated user profiles stored in the state machine and the number of simulated user profiles expected to be generated may indicate that the issue or bug exists in the application deployed in the production environment.

Certain embodiments may include a system. The system may include one or more data processors; and a non-transitory computer-readable storage medium containing instructions which, when executed on the one or more data processors, cause the one or more data processors to perform the computer-implemented method described above (and further detailed herein).

Certain embodiments may include a computer-program product tangibly embodied in a non-transitory machine-readable storage medium, including instructions configured to cause a data processing apparatus to perform the computer-implemented method described above (and further detailed herein).

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention.

However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
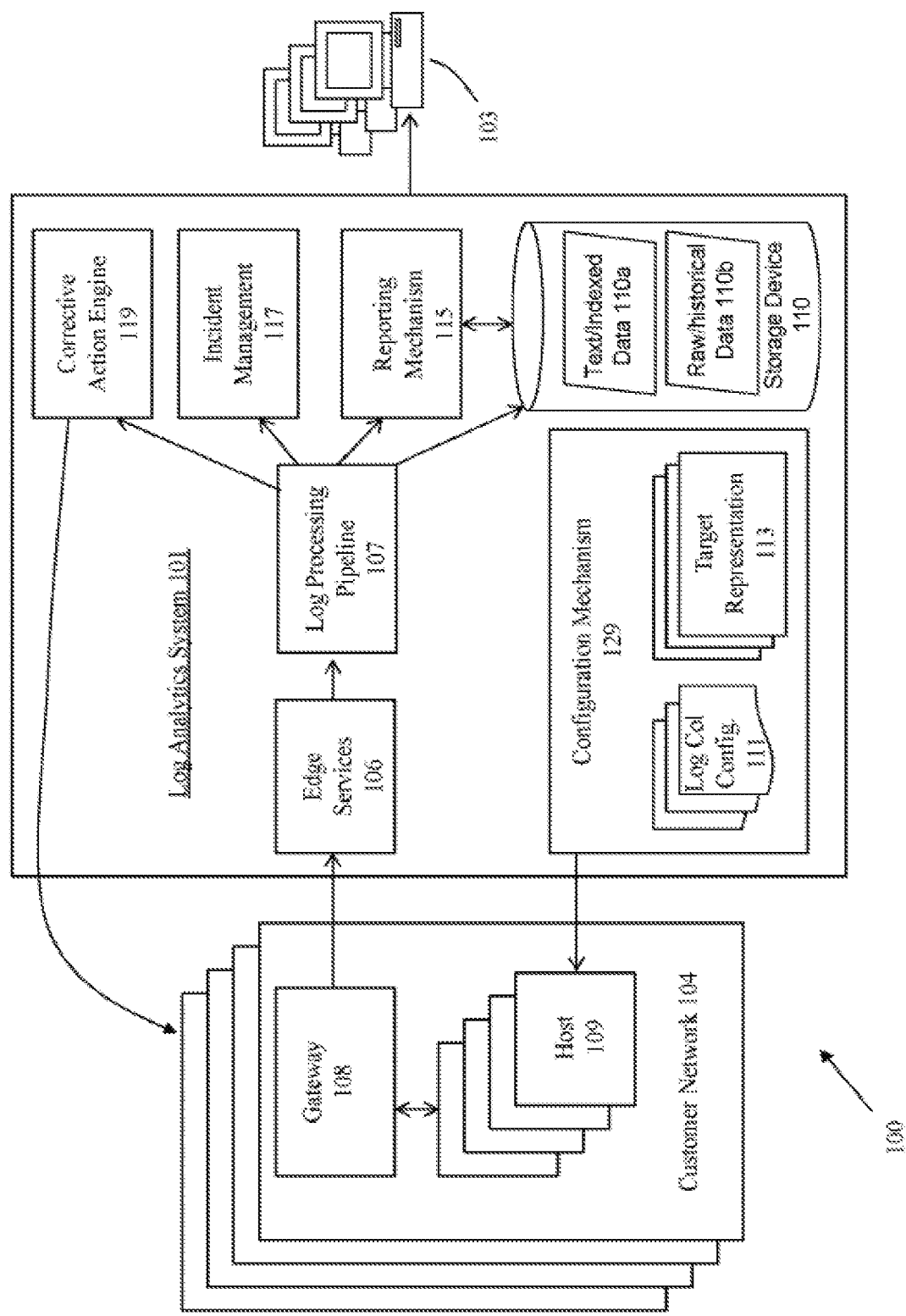
FIG. 1A illustrates an example system for configuring, collecting, and analyzing log data, according to certain embodiments.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each user that needs the service does not need to individually install and configure the service components on the user's own network. The log analytics system 101 is capable of providing the log analytics service to multiple separate users, and can be scaled to service any number of users.

Each user network 104 may include any number of hosts 109. The hosts 109 are the computing platforms within the user network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each user network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the user network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
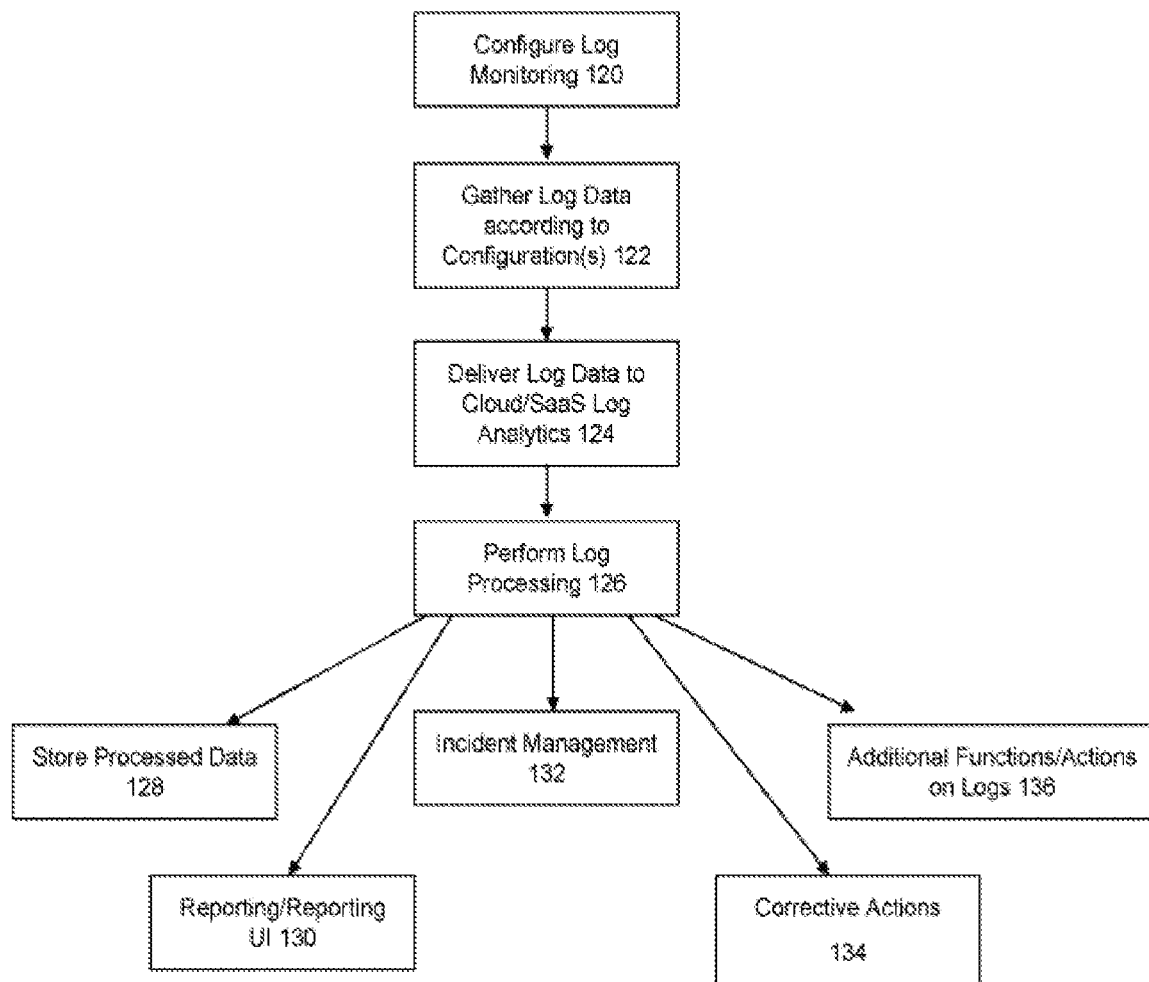
FIG. 1B shows a flowchart of an approach to use a system to configure, collect, and analyze log data, according to certain embodiments.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user to configure the type of log monitoring/data gathering desired by the user. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include user-defined/user-customized rules.

The target representations 113 identify "targets", which are individual components within the user environment that that contain and/or produce logs. These targets are associated with specific components/hosts in the user environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the user network 104 for processing. An agent of the log analytics system is present on each of the hosts 109 to collect data from the appropriate logs on the hosts 109.

In some embodiments, data masking may be performed upon the captured data. The masking is performed at collection time, which protects the user data before it leaves the user network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the user network 104 to the log analytics system 101. The multiple hosts 109 in the user network 104 provide the collected data to a smaller number of one or more gateways 108, which then sends the log data to edge services 106 at the log analytics system 101. The edge services 106 receives the collected data one or more user networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
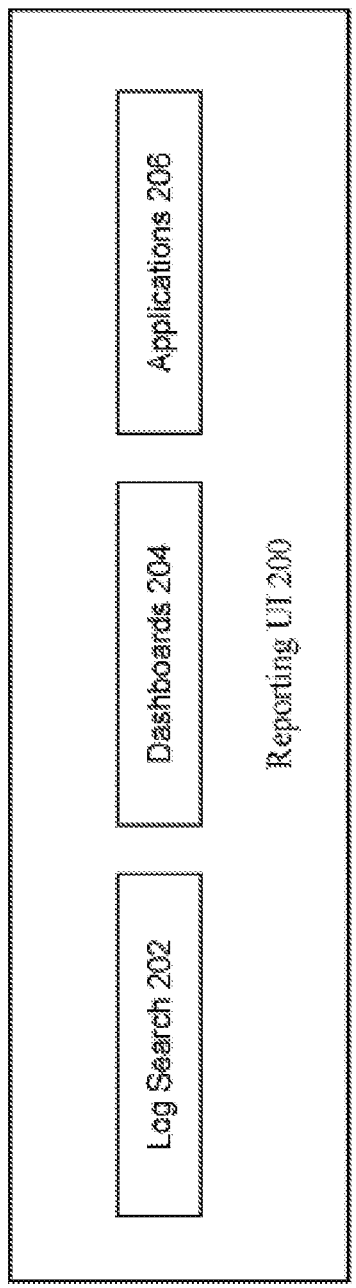
FIG. 2 is a block diagram illustrating components of a reporting user interface (UI), according to certain embodiments.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the user network 104.

For example, a log entry may be received that a database system is down. When such a log entry is identified, a possible automated corrective action is to attempt to bring the database system back up. The user may create a corrective action script to address this situation. A trigger may be performed to run the script to perform the corrective action (e.g., the trigger causes an instruction to be sent to the agent on the user network to run the script). In an alternative embodiment, the appropriate script for the situation is pushed down from the server to the user network to be executed. In addition, at 136, any other additional functions and/or actions may be taken as appropriate based at last upon the processed data.

Figure 3A:
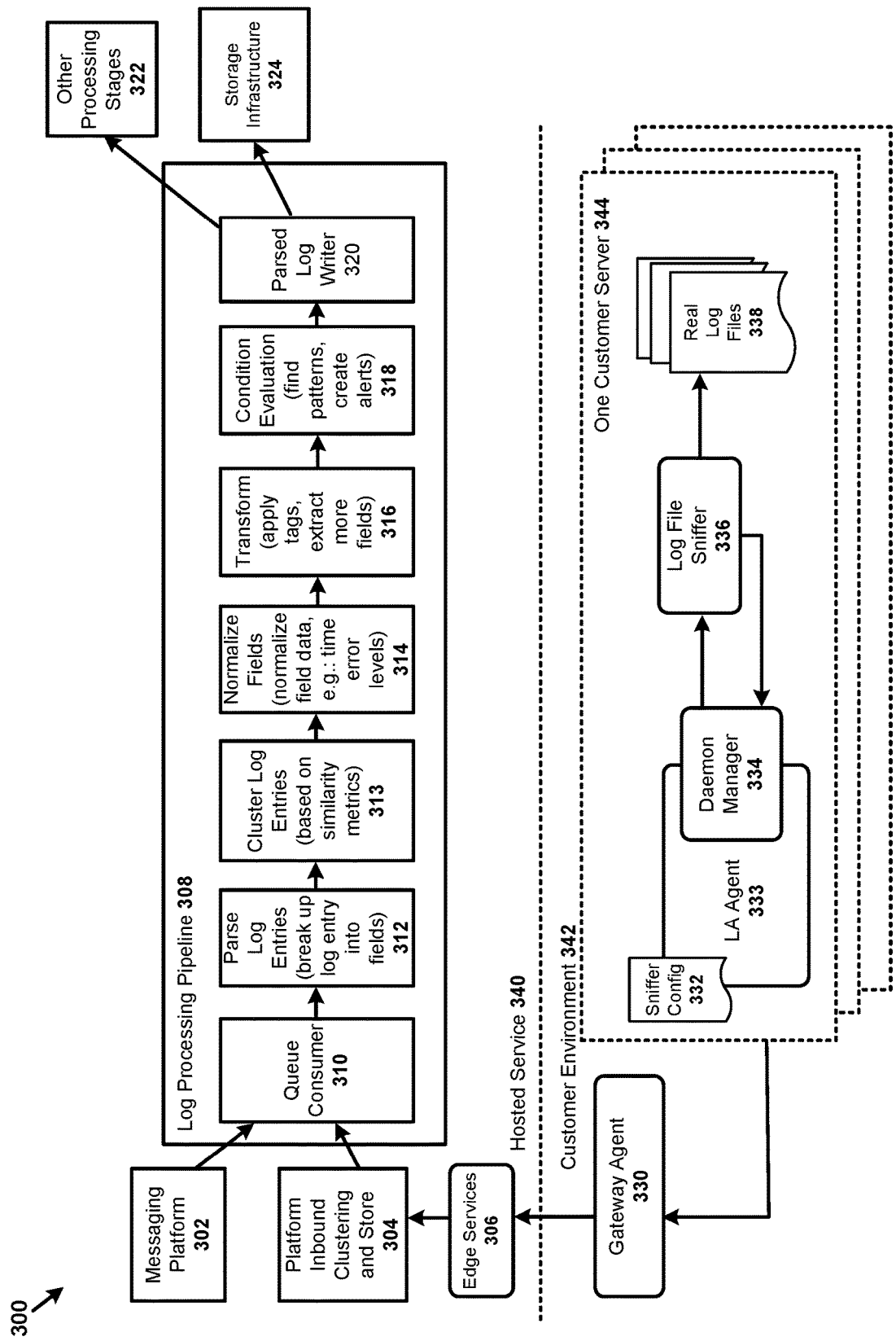
FIG. 3A is a block diagram illustrating an example internal structure of the log analytics system, according to certain embodiments.

FIG. 3A provides a more detailed illustration of the internal structure of the log analytics system at a host environment 340 and the components within the user environment 342 that interact with the log analytics system. This architecture 300 is configured to provide a flow for log monitoring that is able to handle large amounts of log data ingest.

In the user environment 342 within a single user host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple user hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different user environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/users or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
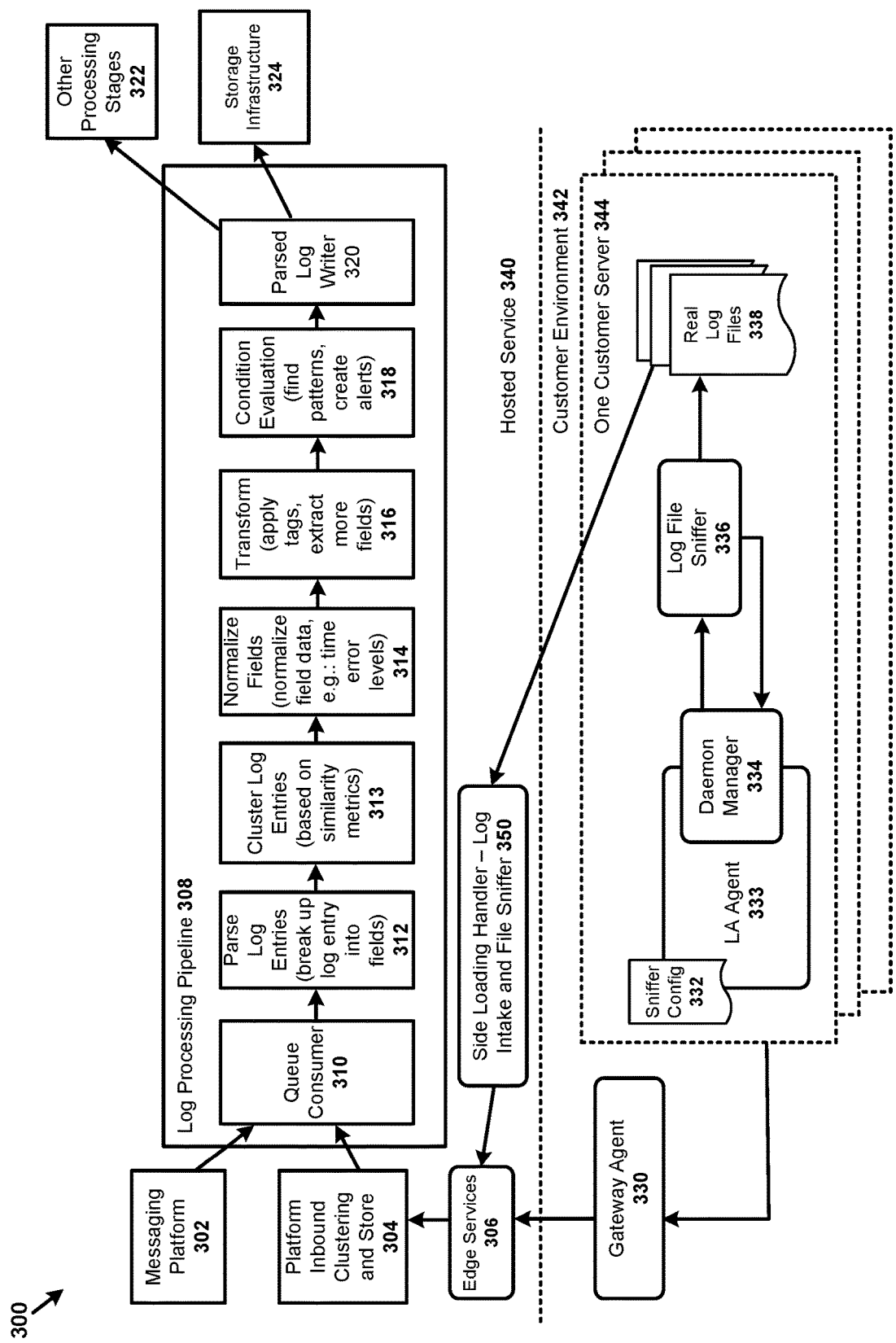
FIG. 3B is a block diagram illustrating an example internal structure of the log analytics system, according to other embodiments.
Figure 3C:
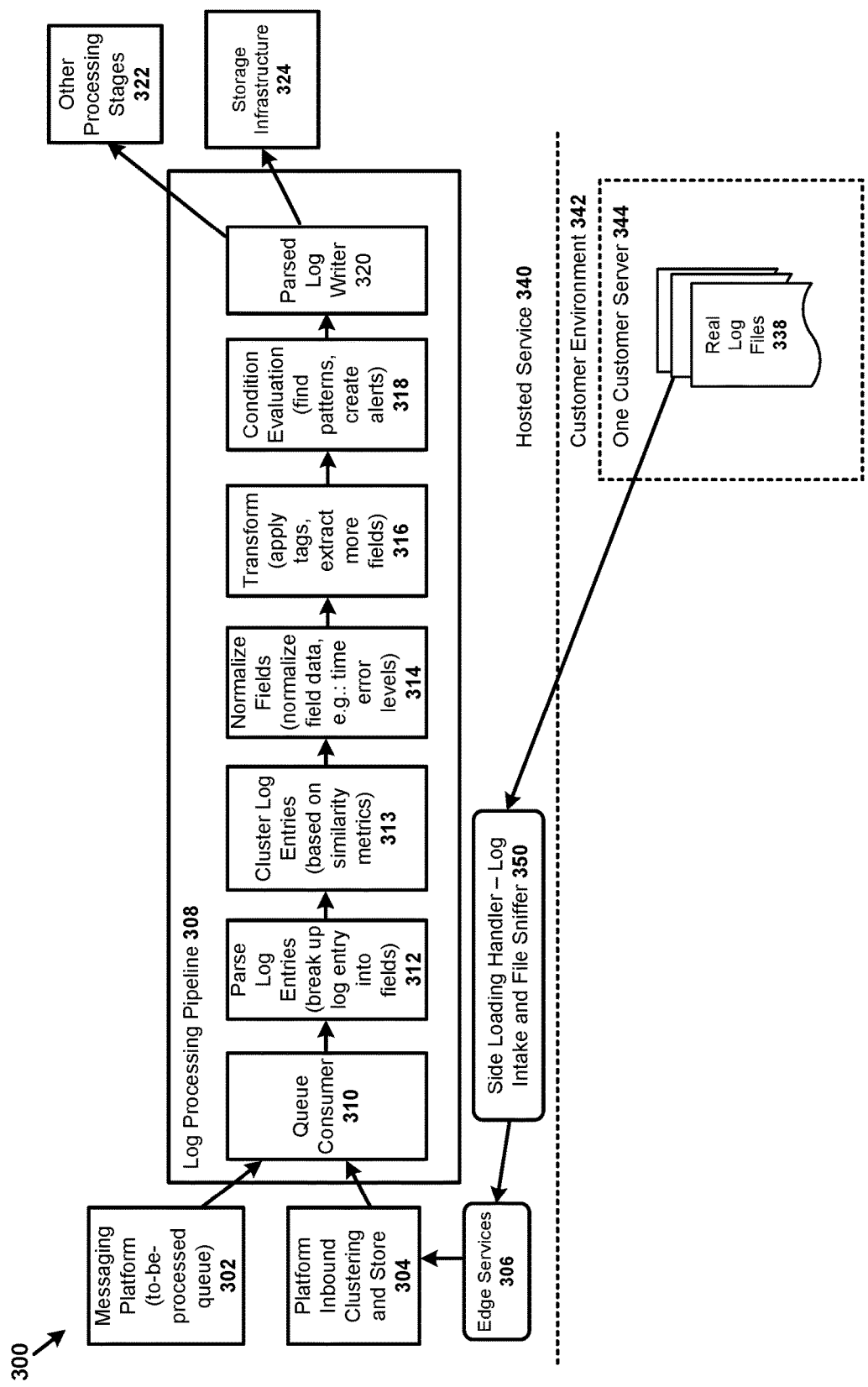
FIG. 3C is a block diagram illustrating an example internal structure of the log analytics system, according to other embodiments.

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

According to aspects of the present disclosure, many business applications have transactional flows (e.g., a flow of one or more stages of a transaction). The flow may be identified using a flow key (e.g., a transaction ID) or any other field present in a log file. The flow key can be used to connect different records and to identify the steps involved in a particular transaction. This feature facilitates the determination of which transaction IDs correspond to a failed operation in the flow in a particular time interval.

Figure 4:
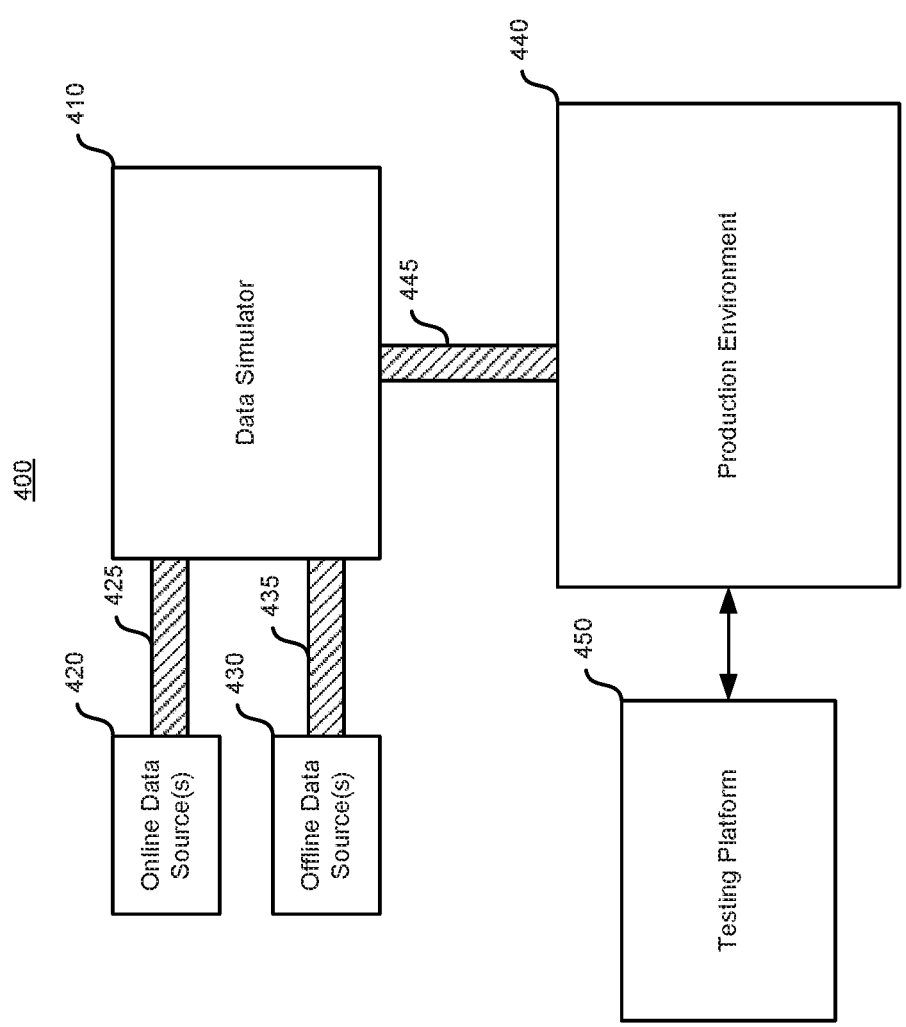
FIG. 4 is a simplified block diagram illustrating an example application environment according to embodiments of the present disclosure.

FIG. 4 shows an example application environment 400 according to an embodiment of the present disclosure. In some implementations, application environment 400 can include data simulator 410, production environment 440, and test platform 450. Data simulator 410 can be configured to receive and ingest datastream 425 from online data source(s) 420 and datastream 435 from offline data source(s) 430. It will be appreciated that a data stream may be received at data simulator 410 from any external system. For example, an external system (e.g., an external partner that is configured to generated or maintain data that is ingested into the testing platform) may transmit data to a network location (e.g., URL) associated with the data simulator 410, so that the data simulator 410 can ingest the incoming data. The incoming data may be processed and/or stored within the testing platform environment. Further, the incoming data may be used to generated simulated profiles to test applications and/or application features in the production environment.

In some implementations, data simulator 410 can generate simulated user profiles. In some implementations, data simulator 410 may generate a simulated user profile using at least two steps. First, data simulator 410 may define a data structure corresponding to a simulated user profile. For example, the data structure corresponding to the simulated user profile may represent a container into which the attributes of that simulated user profile are stored. In some implementations, the attributes stored within the data structure of the simulated user profile may be user-defined. For example, a user may define a protocol that generates 100,000 simulated user profiles a day for 30 days, such that all simulated user profiles include the attribute of "male" and 50 percent of the simulated user profiles include the attribute of "interested in video content ABC." In some implementations, the attributes that are stored within simulated user profiles may be randomly or pseudo-randomly generated, for example, based on real-world data ingested into the data simulator 410 from external systems (as described in greater detail below). One or more attribute monitoring engines (not shown) may monitor and/or track the attributes that are stored in the simulated user profiles. For example, the one or more attribute monitoring engines may monitor and keep a record indicating that 70 percent of the three million simulated user profiles include the attribute of "male," and 40 percent of the three million simulated user profiles include the attribute of "interested in cars." In the case of a user-defined protocol or a random or pseudo-random protocol for including attributes into the simulated user profiles, the expected results may be the expectation of the number of simulated user profiles that include a particular attribute. Continuing with one of the examples above, the expected result of simulated user profiles that include the attribute "interested in video content ABC" is 50 percent of all three million simulated user profiles that are generated over the course of 30 days. As described in greater detail herein, the expected results can be compared against the actual results that are stored in the state machine to determine whether any issues exist with the application or an application feature. For instance, if the expected results are not the same as the actual results (e.g., the number of expected simulated user profiles is not the same as the number of simulated user profiles stored in the state machine), then a technical problem may exist with the application or application feature.

Certain implementations of simulating the user profile may include simulating a browser (e.g., web browser or mobile web browser) accessing a website (e.g., a website URL corresponding to the testing platform). For example, a user agent code may be executed to simulate the web browser or mobile web browser. Based on the simulated browser requesting access to the website, a user-agent string or URL argument string may be generated. The user-agent string or argument string may represent the simulated browser and include one or more attributes that characterize the browser's request to access the website. For example, a user-agent string or an argument string may include information about the simulated browser, such as the browser type, browser version, device type (e.g., desktop or mobile device). In some implementations, the simulated browsers can navigate actual websites (e.g., perform real searches on a travel website), and synthetically call the testing platform with the user-agent string or URL argument string. The testing platform can receive the requests from the simulated browsers and capture the data included in the user-agent strings or URL argument strings of the requests in real-time. The testing platform can generate a simulated user profile for each request received at the testing platform. For example, the testing platform can generate a unique identifier for each simulated user profile to represent a cookie.

In some implementations, once the simulated user profiles have been generated (e.g., the corresponding cookies have been stored in the testing platform), attributes can then be added or included in the simulated user profiles. For example, the simulated user profiles can be configured to synthetically call a URL of the testing platform with a plurality of user-defined (or randomly/pseudo-randomly defined) argument strings to store the attributes within the argument strings as attributes of the simulated user profiles. As a non-limiting example, a simulated user profile may be associated with a synthetic call to the URL of the testing platform (e.g., https://tag.testingplatform.com). The argument string corresponding to the synthetic call to the testing platform may include three arguments. The first argument may be that a search for travel has been executed at a travel website, the second attribute may be the location of interest (e.g., San Francisco), and the third attribute may be the dates of interest (e.g., March 1 through March 7). The three arguments can be individually stored in the data structure of the simulated user profile, so that the simulated user profile corresponds to three attributes (e.g., "interested in travel," "interesting in visiting San Francisco," and "interested in traveling between March 1 and March 7").

In some implementations, the simulated user profile may be associated with user agent code that is configured to browse an actual website (e.g., actually perform a search for travel at a travel website). For example, a user interface (UI) testing tool may be used to browse a website using a simulated browser. The UI testing tool may simulate clicking on a website, and the simulated clicking may create a URL argument string that calls the testing platform (e.g., http://tag.testingplatform.com). The testing platform can then evaluate (e.g., parse) the argument string to extract the attributes in real-time as the argument string is received at the testing platform. These attributes may then be stored in the simulated user profile associated with the simulated browser.

In some implementations, online data source(s) 420 can include any data source that generates, collects and/or stores data points about real-world user profiles (e.g., cookies for real-world online users). For example, online data source(s) 420 can include the uniform resource locator (URL) argument strings from interactions between a website and a user device operated by a real website user. As a non-limiting example, a user device may access a video content website or mobile application and submit a query for particular video content. The real website user's web browser or mobile application can perform a call (e.g., a pixel call) to the application environment 400 (and specifically, data simulator 410) and transmit the URL argument of the search for the particular video content in data stream 420. One or more rules and/or algorithms can be applied to the received URL arguments to parse the URL argument to determine characteristics of the user (e.g., the cookie associated with the real website user may be determined as being interested in the particular video content). Other non-limiting examples of online data source(s) 420 include data sources that collect any information about a cookie associated with a real-world website user or a mobile application user (e.g., collected during an online interaction).

In some implementations, offline data source(s) 430 can include data sources that collect information about a real-world interaction. Offline data source 430 can include data points that are ingested offline and matched to an online profile store. As a non-limiting example, an individual may obtain an item during an in-person interaction (e.g., at a brick and mortar location). That interaction can be mapped to online user profiles or cookies to link the in-person interaction with an online presence (e.g., user profile or cookie). As another non-limiting example, certain online data sources may send a first type of data to data simulator 410 using datastream 425 and a second type of data to data simulator 410 in an offline manner (e.g., not online, but through a printed document or CD storing the relevant data). In this example, the website navigation history associated with a cookie may be transmitted over a network (e.g., using datastream 425) to data simulator 410, whereas, data representing whether or not the cookie is associated with a membership level (e.g., gold membership status) may be transmitted to data simulator 410 in an offline manner (e.g., mailed to an administer of application environment 400 to be ingested into data simulator 410 using one or more data ingestion techniques).

In some implementations, data simulator 410 can ingest data received via each of datastreams 425 and 435 using one or more data ingestion techniques. Further, data simulator 410 can simulate a plurality of user profiles at a large scale (e.g., one million user profiles, one billion user profiles, etc.). Data simulator 410 can continuously simulate a plurality of user profiles (that include potentially dynamically changing attributes) based on the ingested data, which is received via datastreams 425 and 435 as an input feed into data simulator 410. For example, data simulator 410 can simulate a user profile by making a call to an HTTP endpoint, such that the call includes a simulated site ID and a simulated argument list. The simulated argument list can include any combination of available metadata attributes. Data simulator 410 can perform the simulation a plurality of times to generate a plurality of simulated user profiles.

Table 1 includes non-limiting examples of metadata attributes that can be included in a simulated user profile.

TABLE 1

| Metadata Attribute | Example Description |
|---|---|
| Profile/ID | An identifier for a simulated user profile, an identifier for a simulated cookie, user names, email addresses, and other suitable profile IDs. |
| Linkage Metadata | Linkage metadata represents simulated links to one or more other simulated user profiles and/or one or more other simulated devices associated with a particular simulated user profile. For example, in the real world, a user may access a website using a first web browser and/or a second web browser on a desktop. That user may also be associated with other devices, such as a smartphone, a tablet device, a laptop, etc. In a simulated user profile, these links (e.g., between the first web browser and the second web browser and/or between a web browser on a desktop and a mobile browser on a tablet device) are simulated using the linkage metadata. |
| Category Metadata | The category metadata represents categories associated with the simulated user profile. For example, as discussed above in the present disclosure, categories can include "viewed video content ABC," "interested in video content about documentaries," and other suitable categories. |
| Recency | The recency metadata attribute represents the amount of time that has elapsed since the simulated user profile was created or was lasted detected at a website. |
| Frequency | The frequency metadata attribute represents the number of times the simulated user profile was detected at a website. For example, in a situation where a cookie stored at a web browser was detected at a particular website twice in one day may be represented by the frequency metadata attribute (e.g., having a value of "2"). |
| Permission Levels | Permission levels can represent permissions for sharing data about the user profile. For example, in some cases in the real world, a user profile (e.g., a cookie) may include data representing that data about the user profile is not permitted to be shared with a particular destination system (e.g., a competitor's system). In this example, if EXPEDIA.COM shares user information with data simulator 410 in the real world, each user |

TABLE 1-continued

| Metadata Attribute | Example Description |
| --- | --- |
| | profile included in the user information may include a permission indicating that the user profile is not to be shared with or accessible to competitor, KAYAK.COM. This level of permission can be simulated in the user profiles by using the permission levels metadata attribute. |
| Country/Region | The country or region associated with the IP address of the simulated user profile. |
| ID-type | Type of identifiers can include email addresses, phone numbers, physical addresses, IP addresses, MAC addresses, and so on. |
| Timestamp | This metadata attribute represents the timestamp associated with the time at which the simulated user profile was generated. |

Data simulator 410 can simulate a plurality of user profiles using any combination of the metadata attributes with any variation (e.g., a variation in recency or frequency). As a non-limiting example, data simulator 410 can simulate Simulated User Profile A, Simulated User Profile B, and Simulated User Profile C with the following metadata attributes included in Table 2 below.

TABLE 2

| | Simulated Metadata Attributes |
| --- | --- |
| Simulated User Profile A | Interested in cars, woman, recency of 5 days (e.g., simulated user profile generated 5 days ago) |
| Simulated User Profile B | Located in California, interested in travel, male, recency of 14 days (e.g., simulated user profile generated 14 days ago), frequency 3 for being detected at KAYAK.COM within last one day, linked to another cookie associated with an IPHONE. |
| Simulated User Profile C | Interested in electronics, recency of 45 days (e.g., simulated user profile generated 45 days ago) |

It will be appreciated that metadata attributes can be configured to expire after a defined time period. For example, if the metadata attribute representing a category of "interested in electronics" is defined to expire after 10 days, Simulated User Profile C would be deleted because the recency of Simulated User Profile C is over the 10-day period, and Simulated User Profile C has no other metadata attributes.

In some implementations, the simulated user profiles are continuously generated at regular or irregular intervals, and then categorized and stored in the state machine. Further, one or more of the simulated user profiles can be configured to expire after a defined time period. For example, for the purposes of illustration, Table 2 may be a snapshot of Simulated User Profiles A, B, and C on a particular day, and all simulated user profiles expire if the recency metadata attribute includes a value of 15 days or longer expire. In this example, on the particular day, Simulated User Profile A and B are stored in the state machine, but Simulated User Profile C is not because Profile C expired. Further, on the day after the particular day, Simulated User Profile A is stored in the state machine, but Simulated User Profile B is not because Profile B expired.

Advantageously, testing applications using the state machine changes based on when the test is performed. For example, continuing with the above example, if Simulated User Profiles A, B, and C were the only simulated data stored in the state machine, and if a test case was performed on the particular day, the test case would be performed against the data set of Simulated User Profiles A and B because Profile C expired. In contrast, if the test case was performed on the day after the particular day, the test case would be performed against an data set of Simulated User Profile A only because both Profiles B and C would have expired. The ever-changing state machine is better at reflecting a real-world environment, as compared to isolated functional equivalent systems, and thus, certain embodiments described herein provide a technical solution to the technical problems described above and herein.

In some implementations, data simulator 410 can feed the simulated data into production environment 440 using data stream 445. Production environment 440 can process the simulated data, much like it would process real-world data. Further, test platform 450 can perform one or more tests on of the application associated with application environment 400. Advantageously, the one or more tests performed on the application uses the dynamically generated and continuously changing simulated user profiles. In some implementations, a test may include running one or more algorithms on the simulated data stored in the state machine. For example, an algorithm may include a query for all simulated user profiles with metadata attributes corresponding to women interested in cars. The result of the algorithm may include a batch file identifying the simulated user profiles representing women interested in cars. The simulated result (e.g., the batch file including identifiers of cookies corresponding to women interested in cars) can be compared against expected or actual data to verify that the algorithm accurately identifies the desired profiles. In some implementations, test platform 450 can test internal subsystems (e.g., subsystems internal to the production environment 440) to verify that the internal subsystems are performing at desired operating parameters (e.g., checking whether the data pipelines are performing according to standards, load management, etc.).

It will be appreciated that in addition to, or in lieu of, simulated user profiles, the testing platform may execute one or more test cases to evaluate environmental attributes or states (rather than or in addition to profiles with metadata attributes) associated with an application. Metadata attributes may include environmental attributes or states indicating, for example, that the production environment experienced a downtime of two hours in which no new data was received or ingested into the production environment; that, in a video game, an environment state has changed due to a new collectable item (e.g., a power-up) that is available for collection by users; that a video clip was added to a video streaming service; and other suitable environmental attributes or states.

Figure 5:
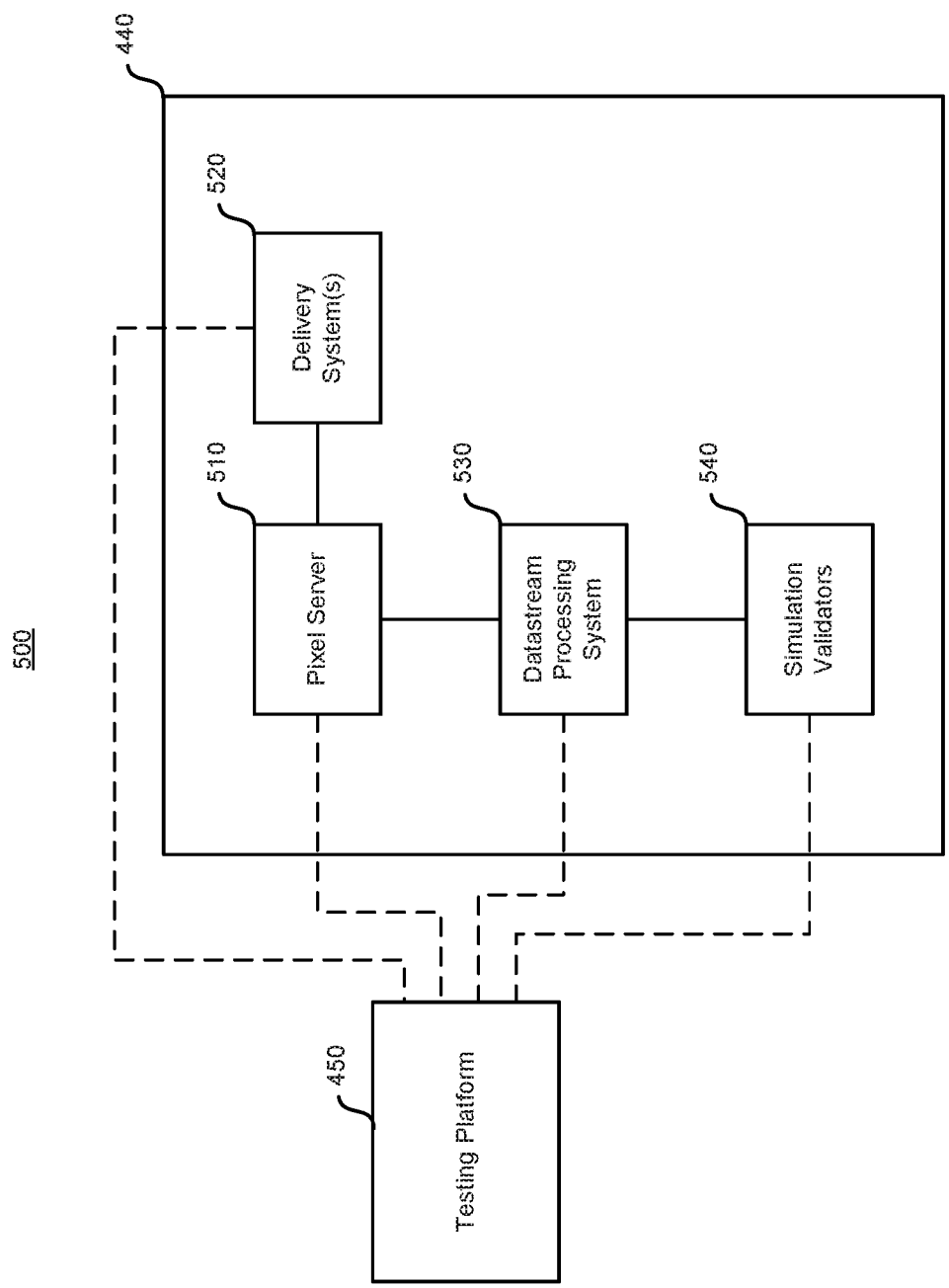
FIG. 5 is a simplified block diagram illustrating an example testing environment according to embodiments of the present disclosure.

FIG. 5 is an example of testing environment 500 according to an embodiment of the present disclosure. In some implementations, testing environment 500 can include test platform 450 and production environment 440. Production environment 440 can include one or more internal subsystems. As illustrated in the example of FIG. 5, production environment 440 may include the following internal subsystems: pixel server 510, delivery system(s) 520, datastream processing system 530, and simulation validators 540. For example, pixel server 510 may operate as an edge server between the data simulator and the production environment; delivery system(s) 520 may be configured to deliver results of test cases to end systems, datastream processing system 530 may operate as a Kafka system, and simulation validators 540 may be configured to validate results of test cases. Test platform 450 may connect with each internal subsystem of production environment to determine whether the internal subsystem is operating within desired parameters when the simulated data is being processed.

In some implementations, the data simulator (e.g., data simulator 410) can continuously generate simulated user profiles with various metadata attributes. Further, one or more simulated user profiles may be configured to expire after a defined time period. The ongoing generation and/or expiration of simulated user profiles are tracked by a state machine. For example, on each day, the total population of all simulated user profiles and their corresponding metadata attributes are stored in the state machine. In this example, each day may represent a different state of the state machine. As time progresses, the state machine tracks the generation and/or expiration of user profiles so that the data that flows into the state machine (e.g., the simulated user profiles that are generated and stored in the state machine) and/or the data that flows out of the state machine (e.g., the simulated user profiles that expire, and thus, are removed from the state machine) are identifiable at any given time within a predefined time duration (e.g., the previous 120 days, etc.). A test case can be continuously tested using the state machine. For example, if a test case is tested on day 1 (e.g., today), the test case will be tested on the population of simulated user profiles stored in the state machine on day 1. The test case can also be tested on day 2. On day 2, the test case will be tested on the population of simulated user profiles that exist on day 2. One or more simulated user profiles that exist on day 1 may expire on day 1, and thus, may not be stored in the state machine on day 2. As an advantage, continuously testing the test case at different times exposes the test case to different populations of simulated user profiles, so that the test case can be tested under different conditions.

In some implementations, when a test case is being tested as described above, test platform 450 can access each internal subsystem of production environment 440 to determine the operating parameters of the internal subsystem. For example, while production environment 440 is testing a test case, test platform 450 can access datastream processing system 530 (e.g., a Kafka system) to determine whether the pipelines of the production environment 440 are operating within predefined standards. As another example, test platform 450 can access pixel server 510 to determine whether the pixel server is operating within predefined operating standards. As an advantage, the data simulator can track the generation and/or expiration of simulated user profiles so that test cases can be tested against any population of simulated user profiles stored in the state machine. As another advantage, test platform 450 can access each internal subsystem during testing of a test case to determine whether the internal subsystems are operating within defined standards.

Figure 6:
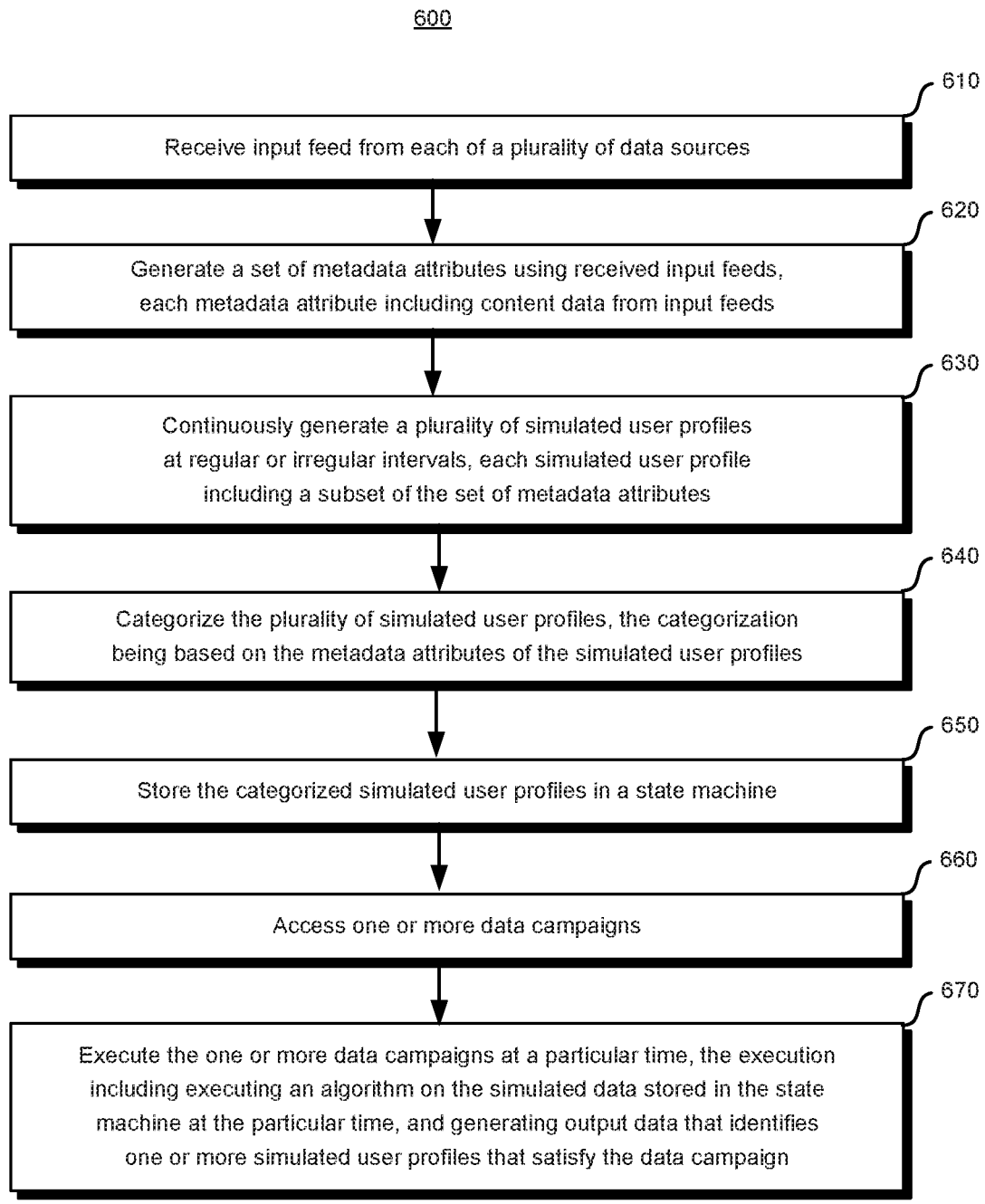
FIG. 6 is a flowchart illustrating an example process for tracking the generation and/or expiration of simulated user profiles in a state machine and testing test cases using the state machine, according to embodiments of the present disclosure.

FIG. 6 is a flowchart illustrating an example process 600 for tracking the generation and/or expiration of simulated user profiles in a state machine and testing test cases using the state machine. Process 600 may be performed, at least in part, by a data simulator (e.g., data simulator 410), a test platform (e.g., test platform 450), and a production environment (e.g., production environment 440). Process 600 may begin at block 610 where one or more input feeds are received at the data simulator from each a plurality of data sources. For example, a data source may be a system that collects, or otherwise stores, user data representing online or offline interactions. An online interaction may be an interaction between a user device and a server (e.g., an online search for flight tickets). An offline interaction may be a real-world interaction (e.g., an in-person interaction). The real-world interaction can be mapped to user data (e.g., cookies) by a data source (e.g., a third-party that maps in-person interactions to online cookies to identify any real-world interactions associated with a cookie). The content data received from the input feed can be ingested by the data simulated so that the content data can be used to simulate user profiles.

At block 620, a set of metadata attributes can be generated using the received input feeds. A metadata attribute may represent a characteristic of a user profile. For example, metadata attributes may include data collected about users online interactions, such as "interested in flights," "interested in cars," "interested in electronics," frequency, recency, permissions, linkages, etc. Each metadata attribute of the set of metadata attributes may include content data from an input feed. For example, real-time data ingested in the data simulator is used to generate the simulated user profiles. Further, one or more metadata attributes of the set of metadata attributes may be configured to expire after a predefined time period. For instance, for a metadata attribute representing that a cookie is interested in electronics, the metadata attribute can be configured to expire when the recency of the simulated user profile is 10 days (e.g., when the simulated user profile is 10 days old).

At block 630, a plurality of simulated user profiles can be continuously generated at a regular or irregular interval. For example, on day 1, one million simulated user profiles can be generated, and on day 2, another one million new simulated user profiles can be generated, and so on. Each simulated user profile of the plurality of simulated user profiles can include any subset of the set of metadata attributes. A simulated user profile can include any number of all available metadata attributes. As an example, the plurality of simulated user profiles can include a first simulated user profile and a second simulated user profile generated on the same day. The first simulated user profile can include a first subset (e.g., any combination of all available metadata attributes, such as "interested in autos" and "female") of the set of metadata attributes. Further, the second simulated user profile can include a second subset (e.g., any combination of all available metadata attributes, such as "interested in electronics") of the set of metadata attributes. In some cases, the first subset may be different from the second subset. In some implementations, the number and/or type of metadata attributes of the first subset can be different than the number and/or type of metadata attributes of the second subset. Of course, it is possible for one or more metadata attributes to overlap between the first subset and the second subset. In some implementations, one or more simulated user profiles of the plurality of simulated user profiles may be configured to expire after a predefined time period (e.g., a simulated user profile can expire if it is 45 days old).

At block 640, each of the plurality of simulated user profiles may be categorized in an ongoing manner. In some implementations, when a simulated user profile is generated, the simulated user profile can be categorized based on the metadata attributes that were included in the simulated user profile. For example, all simulated user profiles that include the metadata attribute of "interested in electronics" can be categorized into a group. As another example, all simulated user profiles that are 12 days old may be categorized into another group. As a result, the categorization of each simulated user profile of the plurality of simulated user profiles can define one or more groups of simulated user profiles.

At block 650, the one or more categorized groups of simulated user profiles can be stored in a state machine in an ongoing manner. In some implementations, the state machine can track the generation and/or expiration of simulated user profiles over time. For example, the tracking can include continuously storing a state of the plurality of simulated user profiles at a regular or irregular interval. In this example, the state of the plurality of simulated user profiles can represent a total population of simulated user profiles that exist at a given time. The total population and/or the metadata attributes of one or more simulated user profiles within the total population may frequently change (e.g., minute to minute, hour to hour, day to day, and so on). In some implementations, when a new simulated user profile is generated, the new simulated user profiles and its corresponding complex metadata attributes can be stored in the state machine. Similarly, if a simulated user profile changes (e.g., a permission stored in the simulated user profile changes), that metadata change can be tracked and stored in the state machine. For example, the state machine can store the simulated user profile before the change in a state, and also, store the simulated user profile after the change in a different, later state. Lastly, if a simulated user profile expires, the simulated user profile can be removed from the state machine after the expiration, however, the state machine can still store the simulated user profile in states that existed before the expiration of the simulated user profile.

To illustrate, on day 1, one million simulated user profiles may be generated. The total population of simulated user profiles and their corresponding metadata attributes that exist on day 1 can be stored as a first state in the state machine. On day 2, another one million new simulated user profiles can be generated. The state machine can store the total population of the new one million simulated user profiles as a second state of the state machine. In this case, on day 2, one or more of the simulated user profiles that were generated on day 1 may have expired by day 2. The state machine may track the expiration of the one or more simulated user profiles because, on day 2, the one or more simulated user profiles that expired would be removed from the second state of the state machine, but would still be included in the first state of the state machine.

At block 660, one or more test cases can be accessed. For example, a test case may include a query to identify all user profiles representing one or more metadata attributes. As a non-limiting example, a test case may include a query of the state machine for all women interested in cars. In some implementations, a test case can include an algorithm to be applied to a particular state of the state machine. The algorithm can generate a result. For example, the result may be an identification of all simulated user profiles that satisfy the query (e.g., all simulated user profiles where the metadata attributes include 1) a woman, and 2) interested in cars).

At block 670, each of the one or more test cases can be executed in the production environment at a particular time. The test case can be executed on any state of the state machine. For example, a test case can be executed on a state of the total population of simulated user profiles that existed six days ago. As a further example, the test case can be executed on the state of the state machine that existed every day starting from six days ago. In this example, the population of simulated user profiles would be different each time the test case is executed. The continuous execution of the test case over different states of the state machine allows developers to test the test case in a more robust manner because the test case is tested on changing populations of simulated user profiles.

In some implementations, the execution of each of the one or more test cases can include executing the algorithm using the state machine at the particular time. The execution of each of the one or more test cases can generate output data including a result of executing the algorithm. For example, generating output data can include delivering a batch file that identifies simulated user profiles that satisfy the test case when executed, such as a batch file that includes identifiers for each simulated user profile that is 10 days old that represents a woman interested in cars. In this example, the result identifies one or more simulated user profiles from the categorized simulated user profiles.

It will be appreciated that the test cases can define to which endpoint and in which format the results of a test case are to be delivered. Delivery of results to can endpoint can correspond to withdrawing from the production environment. For example, on one day, a test case can be created to configure delivery of identified simulated user profiles to an endpoint based on one data set (e.g., audience). On another day, a test case can be created to deliver a different data set (e.g., each hour, each day) to a different end point.

Figure 7:
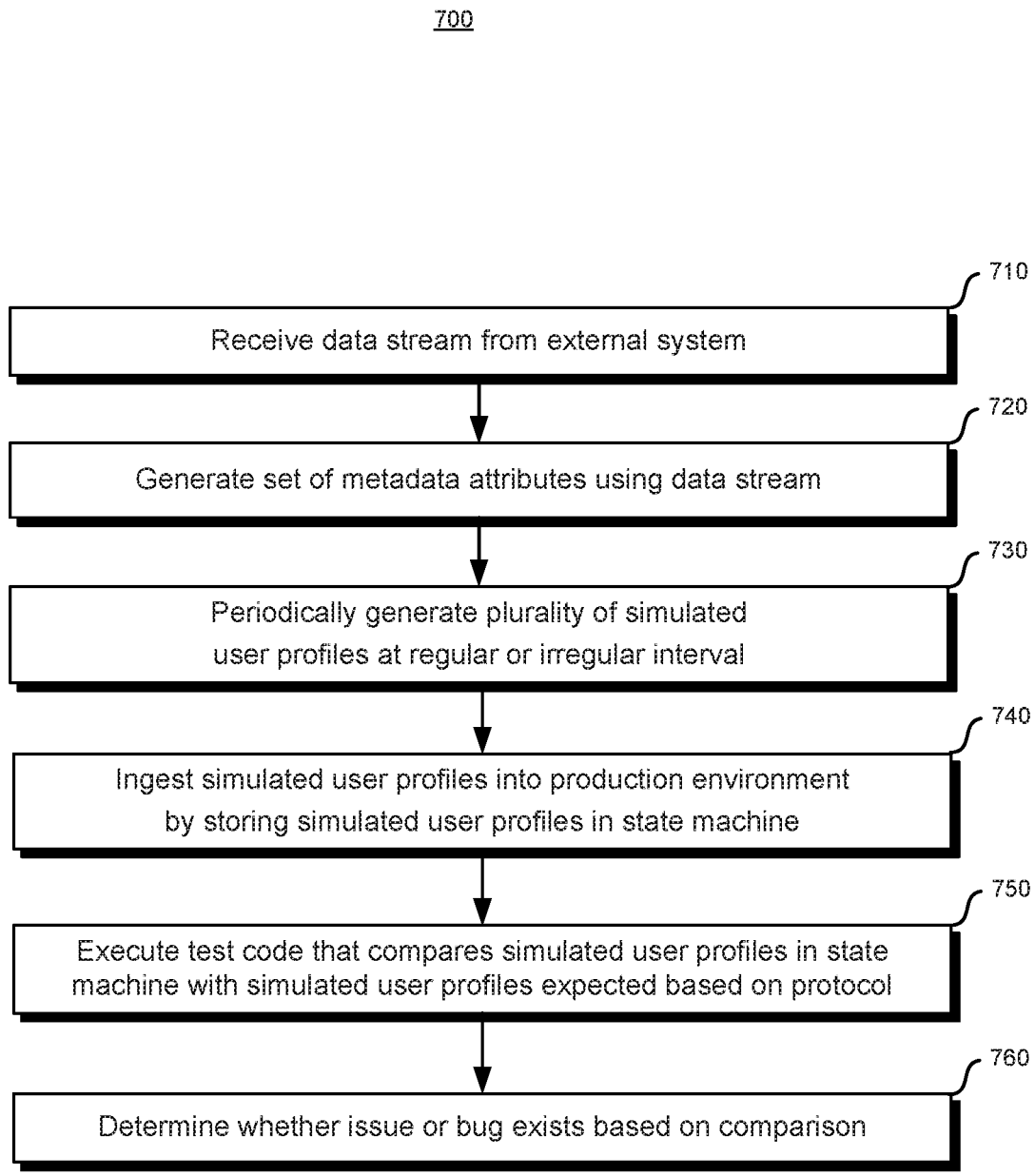
FIG. 7 is a flowchart illustrating an example process for testing an application and/or application feature deployed in a production environment using dynamically changing simulated data, according to embodiments of the present disclosure.

FIG. 7 is a flowchart illustrating an example process 700 for testing an application and/or application feature deployed in a production environment using dynamically changing simulated data. Process 700 may be performed, at least in part, by a data simulator (e.g., data simulator 410), a test platform (e.g., test platform 450), and a production environment (e.g., production environment 440). Process 700 may begin at block 710 where one or more data streams are received at the data simulator from each of one or more external systems. For example, an external system may be a system that collects, or otherwise stores, user data representing online or offline interactions. An online interaction may be an interaction between a user device and a server (e.g., an online search for video content). An offline interaction may be a real-world interaction. The real-world interaction can be mapped to user data (e.g., cookies) by an external system. As another example, an external system may be a system that has partnered with the application being tested, such as a content provider application that delivers streaming video content to a video streaming application. In this example, the video streaming application may be the application being tested and the content provider application may be an external system. Additionally, the testing system (e.g., test platform 450) may be configured to test for issues or bugs in an application deployed in a production environment. For example, the production environment may be a computing environment that enables end users to access the application. Advantageously, process 700 tests the application deployed in the setting of the production environment to mimic real-world scenarios, such as data loss due to an overloaded or overburdened server in the production environment (e.g., a data loss condition, such as a scenario in which data has been lost due to an issue, error or bug in the application).

At block 720, a set of metadata attributes can be generated using the received data streams. In some cases, a metadata attribute may represent a characteristic of a user profile. For example, metadata attributes may include data collected about users online interactions, such as streaming video content, application usage, and so on. Each metadata attribute of the set of metadata attributes may include content data from data stream. For example, real-time data received at the data simulator may be used to generate the simulated user profiles. Further, one or more metadata attributes of the set of metadata attributes may be configured to expire after a predefined time period. For instance, for a metadata attribute representing that a cookie is interested in electronics, the metadata attribute can be configured to expire when the recency of the simulated user profile is 10 days (e.g., when the simulated user profile is 10 days old). In some cases, the metadata attributes that characterize a simulated user profile may change over time. For example, if a permission is set as a metadata attribute of a simulated user profile, that permission may be automatically changed from "permitted" to "opt out" over time.

In some implementations, a simulated user profile may be generated by simulating a web browser accessing the testing platform. When the simulated web browser accesses the testing platform, the testing platform can evaluate the user-agent string associated with the simulated web browser and generate a unique identifier (e.g., a cookie) that identifies the simulated web browser. For example, the user-agent string can be parsed by the testing platform to identify the browser type and/or other characteristics of the simulated web browser. It will be appreciated that the present disclosure is not limited to a web browser, but a mobile browser or mobile application may be simulated to access the testing platform.

In some implementations, associating one or more metadata attributes with a simulated user profile may be performed by navigating various web pages or using various applications using the simulated browser. Navigating the web pages or using applications using a simulated browser causes the simulated browser to be associated with a user-agent string. That user-agent string (e.g., URL argument string) may be generated when the simulated browser accesses the web page or the application. The user-agent string may be include a string of data representing the online activity of the simulated browser. The testing platform can parse the user-agent string to extract one or more metadata attributes that characterizes the activity of the simulated browser.

At block 730, the testing platform may generate one or more simulated user profiles at a regular or irregular interval according to a protocol. For example, the protocol may be a test script or rule that generates 100,000 simulated user profiles on a daily basis for 30 days. Generating the simulated user profiles may be performed using the techniques described herein. For example, 100,000 simulated user profiles may be generated by simulating 100,000 browsers accessing a URL associated with the testing platform. Each time a simulated browser accessing the URL, the testing platform generates and assigns a unique identifier to the simulated browser (e.g., representing a cookie). In some implementations, the testing platform can associate one or more metadata attributes with each unique identifier (e.g., with each simulated user profile). Test scripts can be defined to assign certain attributes to the simulated user profiles. For example, a test script may be executed that assigns to each simulated user profile that is generated on a daily basis for 30 days a metadata attribute of male or female. As another example, a test script may be executed to assigns to each simulated user profile that is generated on a daily basis for 30 days a metadata attribute of "watched video content XYZ" or "interested in comedy shows."

In some implementations, each simulated user profile may simulate an end user of the application in the production environment. Further, the protocol may include one or more rules for iteratively generating one or more simulated user profiles at an interval (e.g., a regular or irregular interval). For example, the protocol may define a subset of the set of metadata attributes to associate with each simulated user profile. For example, a first subset of metadata attributes may include an attribute of "female" and an attribute of "accessed an application." The first subset of metadata attributes may correspond to a first simulated user profile. Further, a second subset of metadata attributes may include an attribute of "male" and an attribute of "viewed a comedy show." The second subset of metadata attributes may correspond to a second simulated user profile.

At block 740, the simulated user profiles can be ingested into the production environment (in which the application is deployed). In some implementations, the simulated user profiles may be ingested into the production environment (e.g., the testing platform) by continuously storing the simulated user profiles in a state machine. As a non-limiting example, on a particular day, 100,000 simulated user profiles may be generated, and each of the 100,000 simulated user profiles may be ingested using the application deployed in the production environment. For example, the production environment may receive a real-time data feed of the simulated user profiles, and the 100,000 simulated user profiles may be stored in a state of the state machine. The state of the state machine may store the total population of the simulated user profiles at a particular time. Additional states of the state machine store the total populations of the simulated profiles that exist at various points of time. For example, a first state of the state machine may store a first population of simulated user profiles that exist at a first time. Further, a second state of the state machine may store a second population of simulated user profiles that exist at a second time.

At block 750, test code (e.g., test scripts) may be executed to test for issues or bugs that may exist in the application and/or in the end-to-end system in which the application is deployed. In some implementations, executing the test code may cause a statistical counting of the number of simulated user profiles stored in the state machine to be performed. Further, executing the test code may cause the number of the simulated user profiles stored in the state machine (e.g., on a particular day or over a period of days) to be compared with a number simulated user profiles expected to be generated. For example, the number of simulated user profiles expected to be generated may be determined using one or more rules included in the protocol. As a non-limiting example, the protocol may define a rule for assigning a metadata attribute of "male" to each of the 100,000 simulated user profiles that are generated. Accordingly, the number of simulated user profiles that is expected to be generated is 100,000 and each simulated user profile is expected to be associated with the "male" metadata attribute.

At block 760, the testing platform may determine whether an issue or bug exists in the application and/or in the end-to-end system in which the application is deployed. For example, the determination of whether an issue or bug exists may be based on the comparison that is performed at block 750. A difference between the number of simulated user profiles stored in the state machine and the number of simulated user profiles expected to be generated indicates that the issue or bug exists in the application and/or in the end-to-end system in which the application is deployed. As a non-limiting example, if the number of simulated user profiles that is expected to be generated (e.g., the number of simulated user profiles generated according to the protocol) is 100,000, and if the number of simulated user profiles that is stored in the state machine (at a given time or over a given time period) is 90,000, then the difference would be 10,000 simulated user profiles. The difference of 10,000 simulated user profiles represents that an error, issue, or bug exists because there has been a data loss of 10,000 simulated user profile.

An example cause of the data loss may be that a server of the production environment that processed at least a portion of the simulated user profiles was overloaded, and thus, cause a data loss of 10,000 simulated user profiles. Another example cause of the data loss may be that one or more external systems have incorrectly called the testing platform, thereby causing the data from the one or more external systems to be lost and not ingested into the production environment (causing the loss of 10,000 simulated user profiles).

Advantageously, the health of an application and/or the existence of issues or bugs within the internal subsystems of the production environment can be evaluated by simulating user profiles having various metadata attributes based on real-world data, ingesting the simulated user profiles into the application and/or into the production environment in which the application is deployed, and executing test scripts that compares the number of ingested simulated user profiles with the expected number of simulated user profiles to determine whether there is any data loss.

Figure 8:
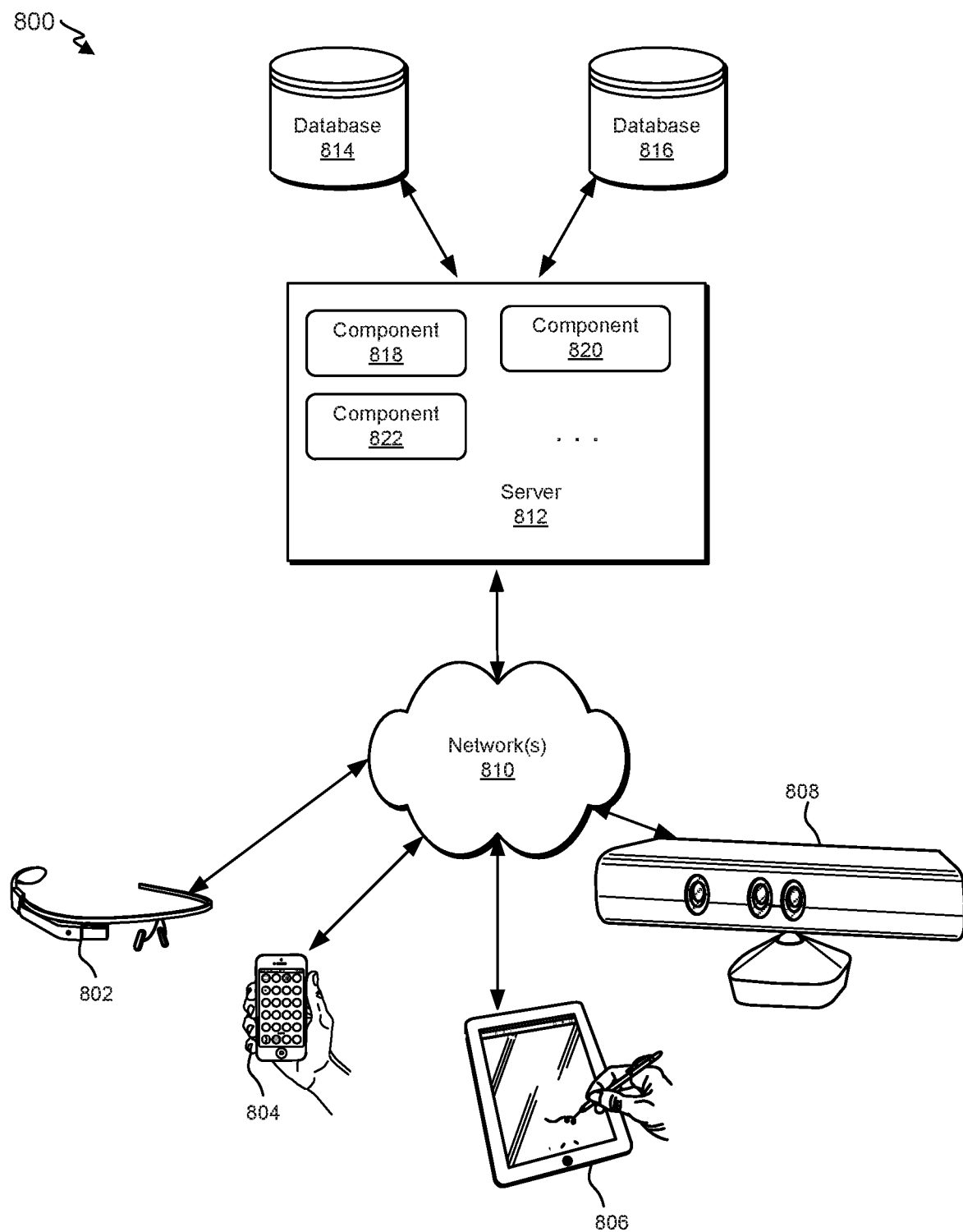
FIG. 8 illustrates a simplified diagram of a distributed system for implementing an embodiment of the present disclosure.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
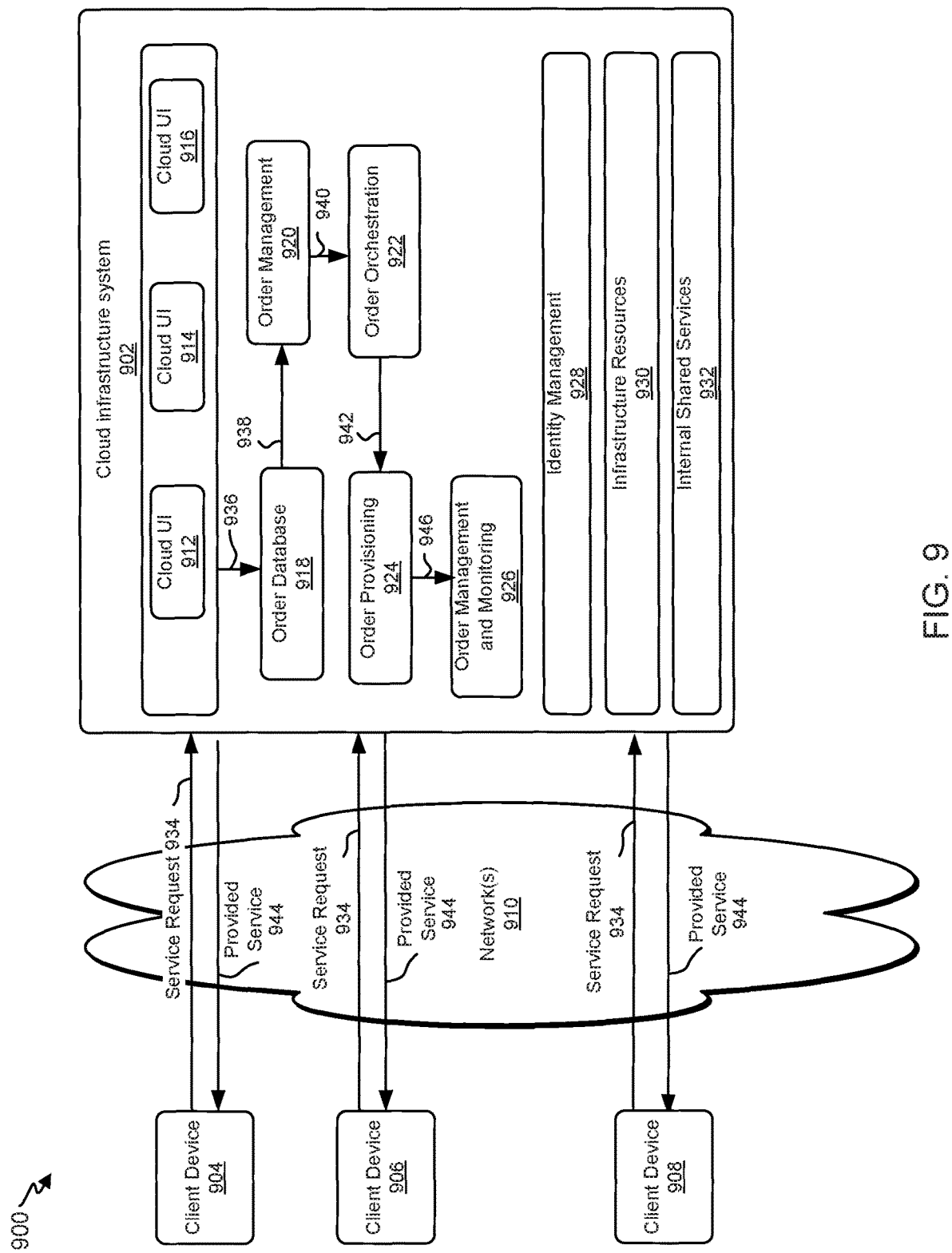
FIG. 9 illustrates a simplified diagram of a distributed system for implementing an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the user's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud third-party to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud third-party's web site.

In certain embodiments, cloud infrastructure system 902 may include a suite of applications, middleware, and database service offerings that are delivered to a user in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a user's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A user, via a subscription order, may order one or more services provided by cloud infrastructure system 902. Cloud infrastructure system 902 then performs processing to provide the services in the user's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, users can utilize applications executing on the cloud infrastructure system. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Examples of platform services include, without limitation, Oracle Java Cloud Service (JCS), Oracle Database Cloud Service (DBCS), and others.

By utilizing the services provided by the PaaS platform, users can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer users a Database as a Service in the form of a database cloud. Middleware cloud services may provide a platform for users to develop and deploy various business applications, and Java cloud services may provide a platform for users to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for users utilizing services provided by the SaaS platform and the PaaS platform.

In certain embodiments, cloud infrastructure system 902 may also include infrastructure resources 930 for providing the resources used to provide various services to users of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a user's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a user using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the user may access a cloud User Interface (UI), cloud UI 912, cloud UI 914 and/or cloud UI 916 and place a subscription order via these UIs. The order information received by cloud infrastructure system 902 in response to the user placing an order may include information identifying the user and one or more services offered by the cloud infrastructure system 902 that the user intends to subscribe to.

After an order has been placed by the user, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the user. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the user. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to users on client devices 904, 906 and/or 908 by order provisioning module 924 of cloud infrastructure system 902.

At operation 946, the user's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about users who wish to utilize the services provided by cloud infrastructure system 902. Such information can include information that authenticates the identities of such users and information that describes which actions those users are authorized to perform relative to various system resources (e.g., files, directories, applications, communication ports, memory segments, etc.) Identity management module 928 may also include the management of descriptive information about each user and about how and by whom that descriptive information can be accessed and modified.

Figure 10:
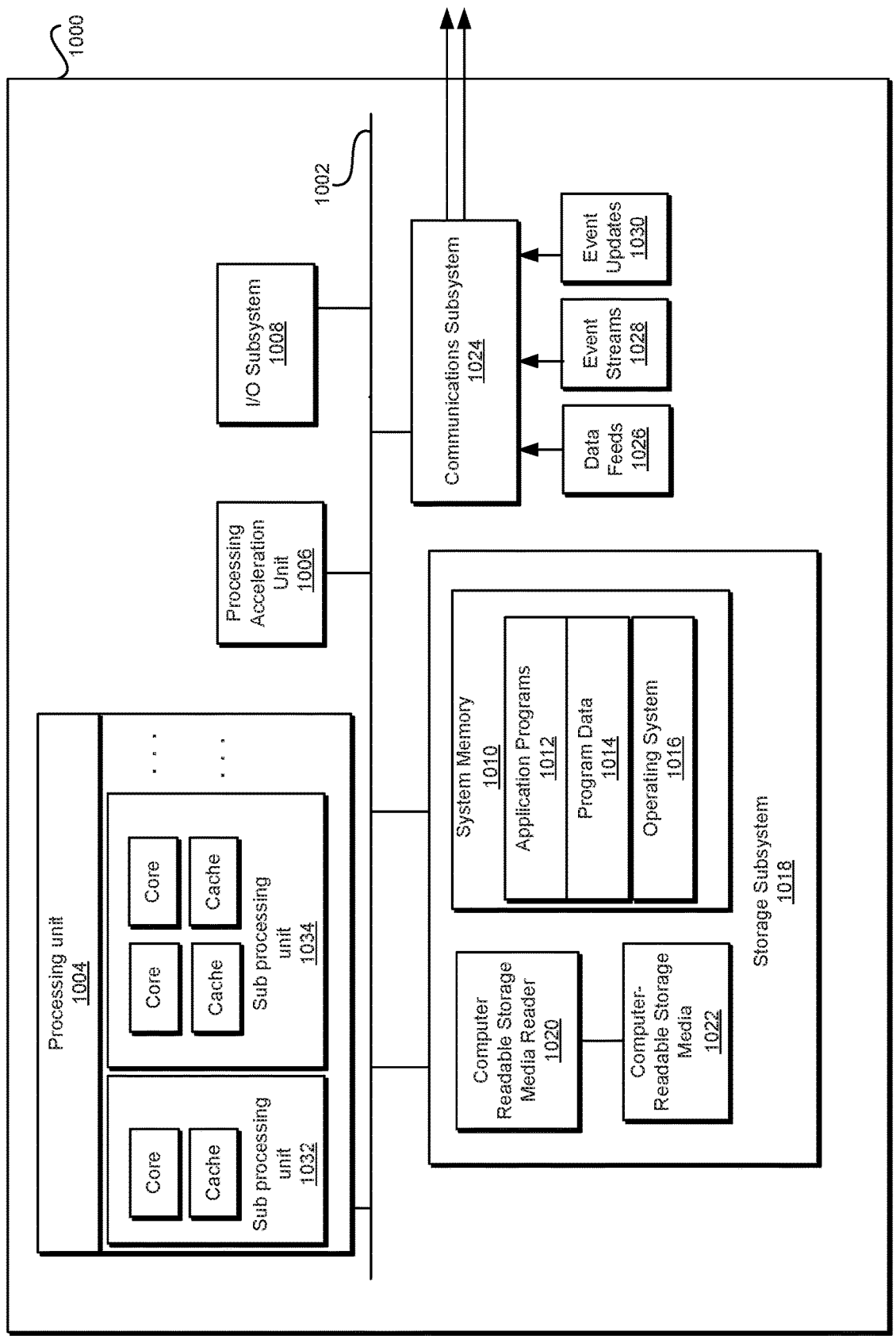
FIG. 10 illustrates an exemplary computer system that may be used to implement an embodiment.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, at a testing system, one or more data streams, each data stream of the one or more data streams being received from an external system, the testing system being configured to test for issues or bugs in an application deployed in a production environment, and the production environment enabling end users to access the application;
   generating a set of events using the one or more data streams, each event of the set of events corresponding to a metadata attribute of a set of metadata attributes, and each metadata attribute of the set of metadata attributes including a portion of data from a data stream of the one or more data streams;
   generating a plurality of simulated user profiles according to a protocol, each simulated user profile simulating an end user of the application in the production environment, the protocol including one or more rules for iteratively generating one or more simulated user profiles at an interval, the protocol defining a subset of the set of metadata attributes to associate with each simulated user profile, and each simulated user profile being characterized by the associated subset of metadata attributes;
   ingesting the plurality of simulated user profiles using the application deployed in the production environment, wherein ingesting includes storing the one or more simulated user profiles in a state machine, the state machine corresponding to a plurality of states, such that each state corresponds to a particular time associated with the interval, and each state representing a total population of simulated user profiles that exist at the particular time associated with the interval;
   executing a test code, wherein the executing test code compares a number of simulated user profiles stored in the state machine with a number simulated user profiles expected to be generated, the number of simulated user profiles expected to be generated being determined using the one or more rules included in the protocol; and
   determining whether an issue or bug exists in the application deployed in the production environment, the determination being based on the comparison, wherein a difference between the number of simulated user profiles stored in the state machine and the number of simulated user profiles expected to be generated indicates that the issue or bug exists in the application deployed in the production environment.

2. The computer-implemented method of claim 1, wherein the difference between the number of simulated user profiles stored in the state machine and the number of simulated user profiles expected to be generated further indicates an issue or bug corresponding to ingesting the plurality of simulated user profiles using the application.

3. The computer-implemented method of claim 1, wherein the protocol is defined to generate a first simulated user profile at a first time and a second simulated user profile at a second time, wherein the second time is later than the first time, and wherein when the second simulated user profile is generated, at least one metadata attribute of a first subset of metadata attributes associated with the first simulated user profile is modified.

4. The computer-implemented method of claim 1, wherein when the difference exists between the number of simulated user profiles stored in the state machine and the number of simulated user profiles expected to be generated, further comprising:
   identifying one or more internal subsystems of the production environment; and
   testing each of the one or more internal subsystems for a data loss condition, wherein the data loss condition causes the difference between the number of simulated user profiles stored in the state machine and the number of simulated user profiles expected to be generated.

5. The computer-implemented method of claim 4, wherein the data loss condition corresponds to data loss due to an overloaded server associated with the production environment.

6. The computer-implemented method of claim 1, further comprising:
executing, at a first time, each of one or more test cases using the state machine, wherein the state machine corresponds to a first population of simulated user profiles at the first time;
executing, at a second time, each of the one or more test cases using the state machine, wherein the state machine corresponds to a second population of simulated user profiles at the second time, and wherein the first population is different than the second population; and
determining whether each of the one or more test cases operates successfully on a first data set and on a second data set.

7. The computer-implemented method of claim 1, further comprising:
identifying a destination system, wherein a result of executing the test code is transmitted to the destination system.

8. A system, comprising:
one or more data processors; and
a non-transitory computer-readable storage medium containing instructions which, when executed on the one or more data processors, cause the one or more data processors to perform operations including:
receiving, at a testing system, one or more data streams, each data stream of the one or more data streams being received from an external system, the testing system being configured to test for issues or bugs in an application deployed in a production environment, and the production environment enabling end users to access the application;
generating a set of events using the one or more data streams, each event of the set of events corresponding to a metadata attribute of a set of metadata attributes, and each metadata attribute of the set of metadata attributes including a portion of data from a data stream of the one or more data streams;
generating a plurality of simulated user profiles according to a protocol, each simulated user profile simulating an end user of the application in the production environment, the protocol including one or more rules for iteratively generating one or more simulated user profiles at an interval, the protocol defining a subset of the set of metadata attributes to associate with each simulated user profile, and each simulated user profile being characterized by the associated subset of metadata attributes;
ingesting the plurality of simulated user profiles using the application deployed in the production environment, wherein ingesting includes storing the one or more simulated user profiles in a state machine, the state machine corresponding to a plurality of states, such that each state corresponds to a particular time associated with the interval, and each state representing a total population of simulated user profiles that exist at the particular time associated with the interval;
executing a test code, wherein the executing test code compares a number of simulated user profiles stored in the state machine with a number simulated user profiles expected to be generated, the number of simulated user profiles expected to be generated being determined using the one or more rules included in the protocol; and
determining whether an issue or bug exists in the application deployed in the production environment, the determination being based on the comparison, wherein a difference between the number of simulated user profiles stored in the state machine and the number of simulated user profiles expected to be generated indicates that the issue or bug exists in the application deployed in the production environment.

9. The system of claim 8, wherein the difference between the number of simulated user profiles stored in the state machine and the number of simulated user profiles expected to be generated further indicates an issue or bug corresponding to ingesting the plurality of simulated user profiles using the application.

10. The system of claim 8, wherein the protocol is defined to generate a first simulated user profile at a first time and a second simulated user profile at a second time, wherein the second time is later than the first time, and wherein when the second simulated user profile is generated, at least one metadata attribute of a first subset of metadata attributes associated with the first simulated user profile is modified.

11. The system of claim 8, wherein when the difference exists between the number of simulated user profiles stored in the state machine and the number of simulated user profiles expected to be generated, further comprising:
identifying one or more internal subsystems of the production environment; and
testing each of the one or more internal subsystems for a data loss condition, wherein the data loss condition causes the difference between the number of simulated user profiles stored in the state machine and the number of simulated user profiles expected to be generated.

12. The system of claim 11, wherein the data loss condition corresponds to data loss due to an overloaded server associated with the production environment.

13. The system of claim 8, further comprising:
executing, at a first time, each of one or more test cases using the state machine, wherein the state machine corresponds to a first population of simulated user profiles at the first time;
executing, at a second time, each of the one or more test cases using the state machine, wherein the state machine corresponds to a second population of simulated user profiles at the second time, and wherein the first population is different than the second population; and
determining whether each of the one or more test cases operates successfully on a first data set and on a second data set.

14. The system of claim 8, further comprising:
identifying a destination system, wherein a result of executing the test code is transmitted to the destination system.

15. A computer-program product tangibly embodied in a non-transitory machine-readable storage medium, including instructions configured to cause a data processing apparatus to perform operations including:
receiving, at a testing system, one or more data streams, each data stream of the one or more data streams being received from an external system, the testing system being configured to test for issues or bugs in an application deployed in a production environment, and the production environment enabling end users to access the application;

generating a set of events using the one or more data streams, each event of the set of events corresponding to a metadata attribute of a set of metadata attributes, and each metadata attribute of the set of metadata attributes including a portion of data from a data stream of the one or more data streams;

generating a plurality of simulated user profiles according to a protocol, each simulated user profile simulating an end user of the application in the production environment, the protocol including one or more rules for iteratively generating one or more simulated user profiles at an interval, the protocol defining a subset of the set of metadata attributes to associate with each simulated user profile, and each simulated user profile being characterized by the associated subset of metadata attributes;

ingesting the plurality of simulated user profiles using the application deployed in the production environment, wherein ingesting includes storing the one or more simulated user profiles in a state machine, the state machine corresponding to a plurality of states, such that each state corresponds to a particular time associated with the interval, and each state representing a total population of simulated user profiles that exist at the particular time associated with the interval;

executing a test code, wherein the executing test code compares a number of simulated user profiles stored in the state machine with a number simulated user profiles expected to be generated, the number of simulated user profiles expected to be generated being determined using the one or more rules included in the protocol; and determining whether an issue or bug exists in the application deployed in the production environment, the determination being based on the comparison, wherein a difference between the number of simulated user profiles stored in the state machine and the number of simulated user profiles expected to be generated indicates that the issue or bug exists in the application deployed in the production environment.

16. The computer-program product of claim 15, wherein the difference between the number of simulated user profiles stored in the state machine and the number of simulated user profiles expected to be generated further indicates an issue or bug corresponding to ingesting the plurality of simulated user profiles using the application.

17. The computer-program product of claim 15, wherein the protocol is defined to generate a first simulated user profile at a first time and a second simulated user profile at a second time, wherein the second time is later than the first time, and wherein when the second simulated user profile is generated, at least one metadata attribute of a first subset of metadata attributes associated with the first simulated user profile is modified.

18. The computer-program product of claim 15, wherein when the difference exists between the number of simulated user profiles stored in the state machine and the number of simulated user profiles expected to be generated, further comprising:

identifying one or more internal subsystems of the production environment; and testing each of the one or more internal subsystems for a data loss condition, wherein the data loss condition causes the difference between the number of simulated user profiles stored in the state machine and the number of simulated user profiles expected to be generated.

19. The computer-program product of claim 18, wherein the data loss condition corresponds to data loss due to an overloaded server associated with the production environment.

20. The computer-program product of claim 15, further comprising:

executing, at a first time, each of one or more test cases using the state machine, wherein the state machine corresponds to a first population of simulated user profiles at the first time;

executing, at a second time, each of the one or more test cases using the state machine, wherein the state machine corresponds to a second population of simulated user profiles at the second time, and wherein the first population is different than the second population; and determining whether each of the one or more test cases operates successfully on a first data set and on a second data set.

* * * * *